United States Patent
Cho et al.

(10) Patent No.: US 10,656,780 B2
(45) Date of Patent: May 19, 2020

(54) POSITION SPECIFYING METHOD AND PROGRAM

(71) Applicant: Mitutoyo Corporation, Kawasaki, Kanagawa (JP)

(72) Inventors: Gyokubu Cho, Kanagawa (JP); Koichi Komatsu, Kanagawa (JP); Hiraku Ishiyama, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/238,928

(22) Filed: Jan. 3, 2019

(65) Prior Publication Data
US 2019/0220167 A1   Jul. 18, 2019

(30) Foreign Application Priority Data

Jan. 12, 2018  (JP) ................. 2018-003145
Jan. 12, 2018  (JP) ................. 2018-003147
Jan. 12, 2018  (JP) ................. 2018-003148
Jan. 12, 2018  (JP) ................. 2018-003149
Jan. 12, 2018  (JP) ................. 2018-003151

(51) Int. Cl.
*G09G 5/08*   (2006.01)
*G06F 3/0481*   (2013.01)
(Continued)

(52) U.S. Cl.
CPC ...... *G06F 3/04812* (2013.01); *G06F 3/04817* (2013.01); *G06F 3/04842* (2013.01); *G06F 3/04883* (2013.01); *G06T 7/13* (2017.01)

(58) Field of Classification Search
CPC ......... G06F 3/048; G06F 3/033; G09B 19/00; G09G 5/08
See application file for complete search history.

(56) References Cited

U.S. PATENT DOCUMENTS

| | | | |
|---|---|---|---|
| 10,275,087 B1* | 4/2019 | Smith | G06F 1/1643 |
| 2015/0143273 A1* | 5/2015 | Bernstein | G06F 3/0488 |
| | | | 715/767 |

(Continued)

FOREIGN PATENT DOCUMENTS

| | | |
|---|---|---|
| JP | H10-197224 | 7/1998 |
| JP | 3595014 | 12/2004 |
| JP | 2016-173703 | 9/2016 |

*Primary Examiner* — Pegeman Karimi
(74) *Attorney, Agent, or Firm* — Rankin, Hill & Clark LLP

(57) ABSTRACT

A method for specifying a position through touch input in a screen displayed on a touch panel display. The position is specified by acquiring an initial contact position with the touch panel display, displaying a position displaying cursor in a position according to the initial contact position, displaying the position displaying cursor in the position according to the initial contact position during the period for which the contact position sensing continues until the distance from the initial contact position to the contact position reaches a predetermined distance and terminating the display of the position displaying cursor where the contact position sensing is terminated before the distance reaches the predetermined distance, and displaying the position displaying cursor in such a way that the position displaying cursor follows movement of the contact position after the distance reaches the predetermined distance.

5 Claims, 23 Drawing Sheets

(51) Int. Cl.
    *G06T 7/13*     (2017.01)
    *G06F 3/0484*     (2013.01)
    *G06F 3/0488*     (2013.01)

(56) References Cited

U.S. PATENT DOCUMENTS

2016/0070441 A1\* 3/2016 Paek .................. G06F 3/04842
    715/773
2016/0274773 A1\* 9/2016 Koga .................. G06F 3/04845
2016/0354694 A1\* 12/2016 Isted ........................ G09B 5/02

\* cited by examiner

POSITION SPECIFYING METHOD AND PROGRAM

CROSS-REFERENCE TO RELATED APPLICATION

This non-provisional application claims priority under 35 U.S.C. § 119(a) from Japanese Patent Application No. 2018-003145, filed on Jan. 12, 2018, Japanese Patent Application No. 2018-003147, filed on Jan. 12, 2018, Japanese Patent Application No. 2018-003148, filed on Jan. 12, 2018, Japanese Patent Application No. 2018-003149, filed on Jan. 12, 2018, and Japanese Patent Application No. 2018-003151, filed on Jan. 12, 2018, the entire contents of which are incorporated herein by reference.

BACKGROUND

Technical Field

The present invention relates to a position specifying method for specifying through touch input a position in a screen displayed on a touch panel display.

Background Art

An image measuring apparatus is used as a measuring apparatus that measures and evaluates the dimensions and shape of a measurement target object (hereinafter also referred to as "workpiece") by using an image obtained by imaging the workpiece. The image measuring apparatus acquires information on an edge (such as position coordinates of edge) of a measurement target figure contained in the captured image of the workpiece and evaluates the shape and dimensions of the workpiece based on the edge information.

In recent years, the spread of a touch panel display has caused what is called a touch interface to be widely used as an intuitively easy-to-use user interface that can be operated, for example, by touching the display, and such a touch interface is also used in an image measuring apparatus (see Japanese Patent Laid-Open No. 2016-173703, for example).

A touch interface allows intuitive operation but has a difficulty in accurately specifying a user's intended position when the user attempts to specify a position in a fine level in a displayed screen. That is, to specify a position in the displayed screen with conventional input means represented by a mouse, a mouse or any other input means is used to move a cursor displayed in the screen and position the cursor accurately in an intended position to specify the position. In contrast, in the case of a touch interface, the center of gravity of a region where a finger or a tip of a pen is in contact with the display is typically the specified position. Since the center of gravity of the contact region is behind the finger or the tip of the pen and therefore invisible to the user, the user cannot grasp the accurate position specified by the user, and it is therefore not easy to accurately specify the intended position.

SUMMARY OF THE INVENTION

Problems to be Solved by the Invention

In view of the problem described above, an object of the present invention is to provide a position specifying method and a program that allow a position to be accurately specified through finger touch input.

Means for Solving the Problems

To solve the problem described above, a position specifying method according to the present invention includes the steps of acquiring an initial contact position that is a contact position at a start of sensing of a position where contact is made with a touch panel display, displaying a position displaying cursor in a position according to the initial contact position, displaying the position displaying cursor in the position according to the initial contact position during a period for which the contact position sensing continues until a distance from the initial contact position to the contact position reaches a predetermined distance and terminating the display of the position displaying cursor with no position specifying operation performed in a case where the contact position sensing is terminated before the distance from the initial contact position to the contact position reaches the predetermined distance, and displaying the position displaying cursor in such a way that the position displaying cursor follows movement of the contact position after the distance from the initial contact position to the contact position reaches the predetermined distance so that a relative positional relationship between the position displaying cursor and the contact position at a point of time when the distance from the initial contact position to the contact position reaches the predetermined distance is maintained during the period for which the contact position sensing continues and setting, when position-specifying-operation finalizing operation is sensed after the distance from the initial contact position to the contact position reaches the predetermined distance, a position where the position displaying cursor is displayed when the position-specifying-operation finalizing operation is sensed to be a specified position.

According to the configuration described above, since the position indicated by the position displaying cursor can be visually recognized, the position can be accurately specified. Further, since no specified position is acquired unless the distance between the contact position and the initial contact position reaches the predetermined distance, unnecessary position specifying operation due to unintended contact can be avoided.

In the present invention, an aspect in which the position displaying cursor is displayed before the distance from the initial contact position to the contact position reaches the predetermined distance may differ from an aspect in which the position displaying cursor is displayed after the distance from the initial contact position to the contact position reaches the predetermined distance. Further in the present invention, the position-specifying-operation finalizing operation may be operation of terminating the contact.

A program according to the present invention causes a computer to carry out any of the position specifying methods described above.

In addition to the above, the present disclosure provides the following items:

(Item 1)

An image measuring apparatus that images a measurement target object and uses an edge detection tool placed by a user in the captured image of the measurement target object displayed on a touch panel display to measure the dimensions and shape of the measurement target object, the image measuring apparatus including control means for causing the edge detection tool displayed on the touch panel display to be selected and editing the edge detection tool in the selected state in correspondence with a tool editing gesture that is a gesture for editing the edge detection tool when the touch panel display is touched in an arbitrary position thereon so that the tool editing gesture is inputted thereto.

(Item 2)

The image measuring apparatus according to the item 1, wherein the tool editing gesture includes pinching-in and pinching-out actions, and editing corresponding to the pinching-in action is reduction of the edge detection tool and editing corresponding to the pinching-out action is enlargement of the edge detection tool.

(Item 3)

The image measuring apparatus according to the item 1 or 2, wherein the tool editing gesture includes a rotating action, and editing corresponding to the rotating action is rotation of the edge detection tool.

(Item 4)

The image measuring apparatus according to any one of the items 1 to 3, wherein the tool editing gesture includes a swiping action performed in a two-point simultaneous contact state, and editing corresponding to the swiping action performed in the two-point simultaneous contact state is parallel translation of the edge detection tool in a swiping direction.

(Item 5)

The image measuring apparatus according to any one of the items 1 to 4, wherein the edge detection tool is selected when the edge detection tool displayed on the touch panel display is touched and a tool selecting gesture that is a gesture for selecting the edge detection tool is inputted.

(Item 6)

The image measuring apparatus according to the item 5, wherein the tool selecting gesture is a tapping action.

(Item 7)

A tool editing method for editing an edge detection tool when a measurement target object is imaged and the edge detection tool placed by a user in the captured image of the measurement target object displayed on a touch panel display is used to measure dimensions and a shape of the measurement target object, the tool editing method carrying out:

a selection step of causing the edge detection tool displayed on the touch panel display to be selected; and an editing step of editing the edge detection tool in the selected state in correspondence with a tool editing gesture that is a gesture for editing the edge detection tool when the touch panel display is touched in an arbitrary position thereon so that the tool editing gesture is inputted thereto.

(Item 8)

The tool editing method according to the item 7, wherein the tool editing gesture includes pinching-in and pinching-out actions, and editing corresponding to the pinching-in action is reduction of the edge detection tool and editing corresponding to the pinching-out action is enlargement of the edge detection tool.

(Item 9)

The tool editing method according to the item 7 or 8, wherein the tool editing gesture includes a rotating action, and editing corresponding to the rotating action is rotation of the edge detection tool.

(Item 10)

The tool editing method according to any one of the items 7 to 9, wherein the tool editing gesture includes a swiping action performed in a two-point simultaneous contact state, and editing corresponding to the swiping action performed in the two-point simultaneous contact state is parallel translation of the edge detection tool.

(Item 11)

The tool editing method according to any one of the items 7 to 10, wherein the edge detection tool is selected when the edge detection tool displayed on the touch panel display is touched and a tool selecting gesture that is a gesture for selecting the edge detection tool is inputted.

(Item 12)

The tool editing method according to the item 11, wherein the tool selecting gesture is a tapping action.

(Item 13)

A program for causing a computer to function as control means in the image measuring apparatus described in any of the items 1 to 6.

(Item 14)

An image measuring apparatus that images a measurement target object and measures dimensions and a shape of the measurement target object based on the captured image of the measurement target object displayed on a touch panel display, the image measuring apparatus including control means for identifying a command corresponding to a gesture inputted through touching operation performed on the touch panel display based on a signal outputted from the touch panel display in accordance with the gesture and executing the command on a portion of the image measuring apparatus that is a portion on which the command is executed, wherein the gesture is performed in an at-least-two-point simultaneous contact state.

(Item 15)

The image measuring apparatus according to the item 14, wherein the command is a command that causes physical movement/motion of the portion of the image measuring apparatus.

(Item 16)

The image measuring apparatus according to the item 14 or 15, wherein the gesture performed in the at-least-two-point simultaneous contact state is a tapping, double tapping, long tapping, flicking, swiping, or rotating action.

(Item 17)

A program for causing a computer to function as control means in the image measuring apparatus described in any of the items 14 to 16.

(Item 18)

An image measuring apparatus that images a measurement target object placed on a stage movable in two- or three-dimensional directions and measures the dimensions and shape of the measurement target object based on the captured image of the measurement target object displayed on a touch panel display, the image measuring apparatus further including control means for displaying a button labeled with an identifier for inputting a predetermined command in such a way that the button is superimposed on the captured image displayed on the touch panel display, further displaying, when a user performs touch input operation on the portion where the identifier is displayed, a menu for selectively inputting an action mode of the command corresponding to the button on the touch panel display, assigning, when the user selects any of action modes in the menu through touch input operation, the selected action mode to the button, and executing, when the user performs touch input operation on the button, the command corresponding to the button in the assigned action mode.

(Item 19)

The image measuring apparatus according to the item 18, wherein the predetermined command is a command that causes the stage to move in any of the two- or three-dimensional directions, the button labeled with the identifier is a direction button labeled with an identifier representing any of the two- or three-dimensional directions, and the action mode includes at least two of fine movement, stepwise movement, and continuous movement.

(Item 20)

The image measuring apparatus according to the item 18 or 19, wherein the control means displays the button when the user performs a predetermined input operation.

(Item 21)

A program for causing a computer to function as control means in the image measuring apparatus described in any of the items 18 to 20.

(Item 22)

An image measuring apparatus including an imager that acquires an image of a measurement target object, a touch panel display that displays the image acquired by the imager and accepts touch input operation of specifying a position in the displayed image, and an edge detector that searches for and detects an edge present in a predetermined range around the in-image specified position specified by a user's touch input operation in the image displayed on the touch panel display, wherein when a plurality of edges are found in a vicinity of the specified position, the edge detector causes a control object for selecting each of the edges to be displayed on the touch panel display not only in an aspect that prevents a wrong edge from being selected through the touch operation but in an aspect that allows visual recognition of a correspondence between each of the edges and a corresponding control object.

(Item 23)

The image measuring apparatus according to the item 22, wherein the edge detector sets the predetermined range, over which an edge is searched for, in accordance with a size of a region where the touch panel display senses contact resulting from the touch input operation.

(Item 24)

The image measuring apparatus according to the item 22, further comprising second input means that differs from the touch panel display allowing input operation of specifying a position, wherein the edge detector, when touch operation performed on the touch panel display specifies the specified position, searches a wider range to detect an edge than in a case where the specified position is specified by input operation performed on the second input means.

(Item 25)

An image measuring method comprising the steps of:

displaying an image of a measurement target object on a touch panel display;

accepting touch input operation of specifying a position in the image displayed on the touch panel display; and searching for and detecting an edge present in a predetermined range around the specified position specified in the touch operation accepting step, wherein when a plurality of edges are found in a vicinity of the specified position, a control object for selecting each of the edges is displayed on the touch panel display not only in an aspect that prevents a wrong edge from being selected through the touch operation but in an aspect that allows visual recognition of a correspondence between each of the edges and a corresponding control object.

(Item 26)

A program for detecting an edge of a figure contained in an image of a measurement target object, wherein the image measuring program causes a computer to perform the image measuring method described in the item 25.

DETAILED DESCRIPTION OF THE EMBODIMENTS

Figure 1:
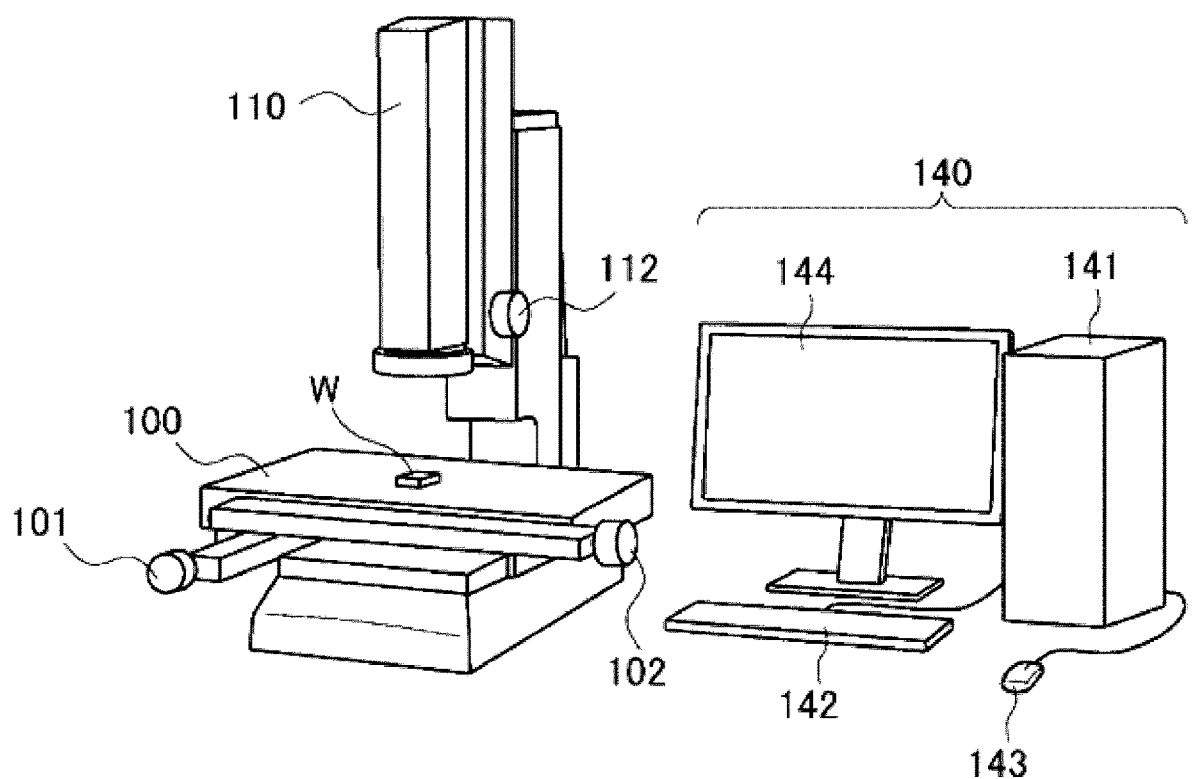
FIG. 1 shows an example of the overall configuration of an image measuring apparatus.

Embodiments of the present invention will be described below with reference to the drawings. In the following description, the same members have the same reference character, and a member having been described once will not be described as appropriate.

First Embodiment

[Configuration of Image Measuring Apparatus]

FIG. 1 shows an example of the overall configuration of an image measuring apparatus. An image measuring apparatus 1 includes a stage 100, an enclosure 110, and a computer system 140. The stage 100 is so disposed that the upper surface thereof coincides with a horizontal plane, and a workpiece W is placed on the upper surface. The stage 100 can be moved in an X-axis direction and a Y-axis direction by motors or operation of rotating handles 101 and 102. The enclosure 110 accommodates an optical system including an illuminator, such as a transmission illuminator and a vertical illuminator, and an imaging device, the enclosure 110 itself along with the optical system and the imaging device can be moved in a Z-axis direction by a motor or operation of rotating a handle 112.

The computer system 140 controls the stage 100 and the enclosure 110 to acquire a captured image of the workpiece W and provide a user with an operation environment. The computer system 140 includes, for example, a computer main body 141, a keyboard 142, a mouse 143, and a touch panel display 144. The computer main body 141 controls the actions of the stage 100 and the enclosure 110 based on a circuit (hardware), such as a control board, and a program (software) executed by a CPU. The computer main body 141 further acquires and computes information on the workpiece W based on signals outputted from the stage 100 and the enclosure 110 and displays the result of the computation on the touch panel display 144. The keyboard 142 and the mouse 143 are means for inputting information to the computer main body 141. The touch panel display 144 functions as display means for displaying an image outputted from the computer main body and further functions as input means for detecting screen touch operation and inputting information corresponding to the operation to the computer main body 141.

Figure 2:
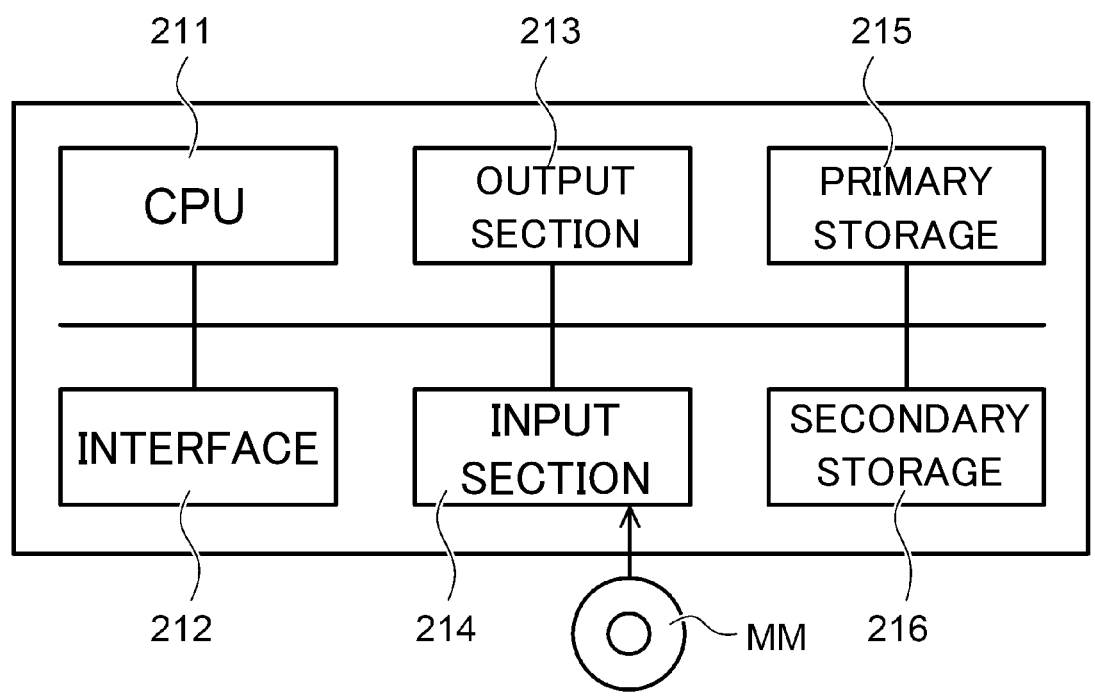
FIG. 2 is a functional block diagram of a computer system.

FIG. 2 is a functional block diagram of the computer system 140. The functional blocks of the computer system 140 include a CPU (central processing unit) 211, an interface 212, an output section 213, an input section 214, a primary storage 215, and a secondary storage 216.

The CPU 211 executes a variety of programs to control each portion of the image measuring apparatus. The interface 212 is a portion responsible for input and output of information from and to an external apparatus, specifically, that is, a portion that captures information sent from the stage 100 and the enclosure 110 and forwards the information to the computer system 140, sends information from the computer system 140 to the stage 100 and the enclosure 110, connects the computer system 140 to a LAN (local area network) or a WAN (wide area network), and performs other roles.

The output section 213 outputs a result of a process carried out by the computer system 140. As the output section 213, for example, the touch panel display 144 shown in FIG. 1 and a printer are used. The input section 214 accepts information from an operator. As the input section 214, for example, the keyboard 142, the mouse 143, and the touch panel display 144 shown in FIG. 1 are used. The input section 214 has the function of reading information recorded on a recording medium MM. The recording medium MM stores an image display program and a control program containing sentences that achieve the functions of control means in the present invention, and the CPU reads and executes the programs to achieve the functions of the control means and other means.

The primary storage 215 is, for example, a RAM (random access memory). Part of the secondary storage 216 may be used as part of the primary storage 215. The secondary storage 216 is, for example, an HDD (hard disk drive) or an SSD (solid state drive). The secondary storage 216 may instead be an external storage device connected to the computer system 140 via a network.

[Screen Display]

A description will next be made of screen display displayed on the touch panel display 144 by a program (measurement application software) executed by the CPU 211 of the computer main body 141.

Figure 3:
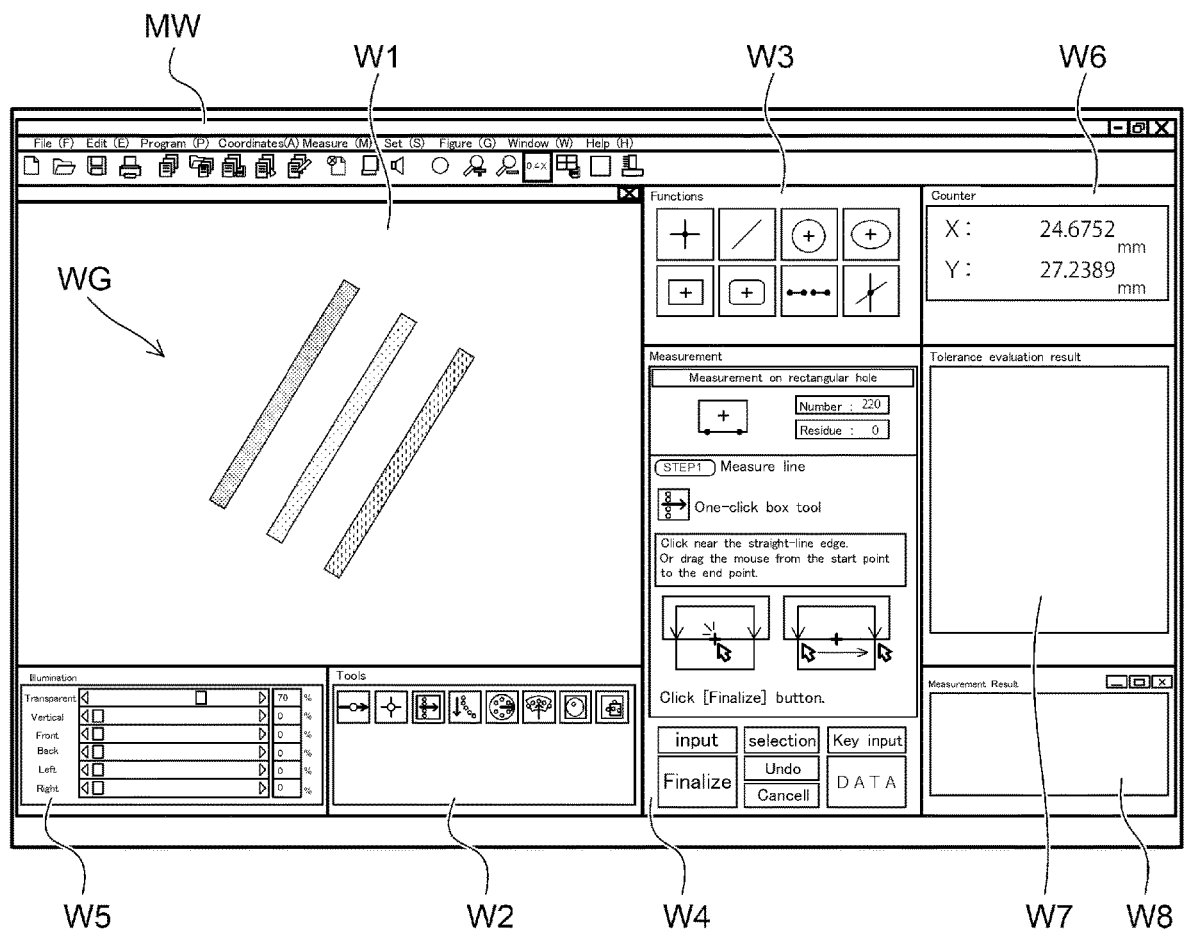
FIG. 3 shows an example of a displayed screen displayed on a touch panel display.

FIG. 3 shows an example of the displayed screen displayed on the touch panel display 144 when the program is executed. A main window MW is displayed on the touch panel display 144, as shown in FIG. 3. A plurality of windows (first window W1 to eighth window W8) are displayed in the main window MW. A menu and icons for a variety of types of operation and setting are displayed in an upper portion of the main window MW. In the present embodiment, the eight windows are displayed by way of example, and a window other than the eight windows can be displayed as required. The layout of the windows can be freely changed by the user's manipulation.

In the first window (also called workpiece window in some cases) W1, an image WG of the workpiece W captured by the image measuring apparatus 1 is displayed. The user, for example, can enlarge/reduce the image WG of the workpiece W by performing operation of selecting an icon with the mouse 143, and narrowing or widening (what is called pinching out/pinching in) the gap between the positions where two fingers touch the display region of the first window W1 on the touch panel display 144. The user can further adjust the position of the image WG of the workpiece W displayed in the first window W1 on the touch panel display 144 by performing operation of causing a finger to slide (what is called swiping) with the finger kept in contact with the display region of the first window W1.

In the second window W2, icons of user selectable tools are displayed. The icons of the tools are provided in correspondence with specifying methods for specifying a measurement point on the image WG of the workpiece W.

In the third window W3, icons of user selectable functions are displayed. The icons of the functions are provided on a measuring method basis. Examples of the measuring method include a method for measuring the coordinates of one point, a method for measuring the length of a straight line segment, a method for measuring a circle, a method for measuring an ellipse, a method for measuring a rectangular hole, a method for measuring an elongated hole, a method for measuring intervals, and a method for measuring intersection of two lines.

In the fourth window W4, guidance showing a measurement operation procedure and picture patterns corresponding to operation steps are displayed.

In the fifth window W5, a variety of sliders are displayed for controlling illumination with which the workpiece W is irradiated. The user can manipulate any of the sliders to apply desired illumination to the workpiece W.

In the sixth window W6, the XY coordinates of the stage 100 are displayed. The XY coordinate values displayed in the sixth window W6 are the coordinates of the stage 100 in the X-axis and Y-axis directions with respect to a predetermined origin.

In the seventh window W7, a tolerance evaluation result is displayed. That is, when a measuring method that allows tolerance evaluation is selected, the result of the evaluation is displayed in the seventh window W7.

In the eighth window W8, a measurement result is displayed. That is, when a measuring method in which predetermined computation provides a measurement result is selected, the result of the measurement is displayed in the eighth window W8. The detail of the tolerance evaluation result in the seventh window W7 and the measurement result in the eighth window W8 are not shown herein.

[Position Specifying Process]

Figure 4:
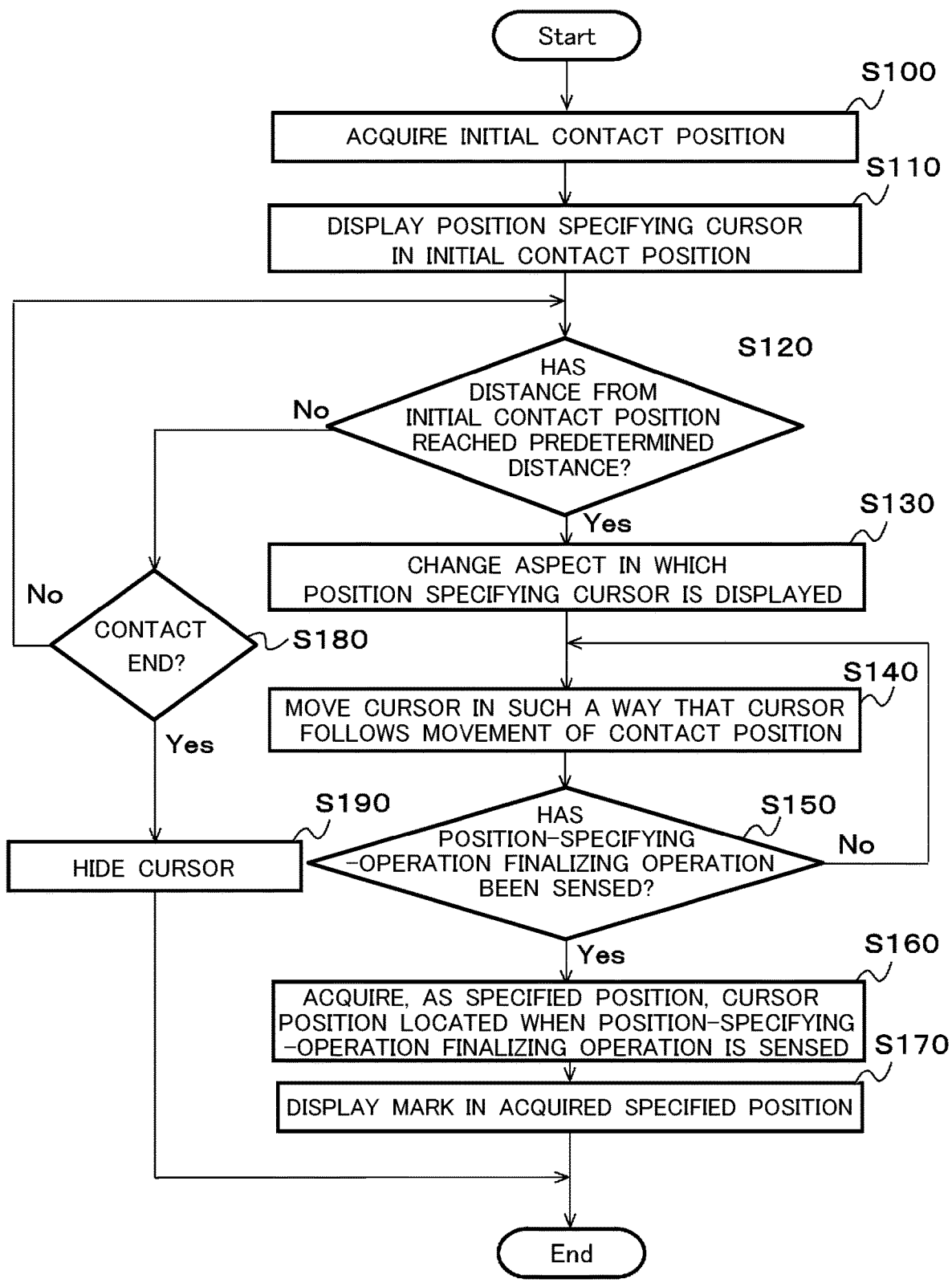
FIG. 4 is the flowchart of a position specifying process.

A description will subsequently be made of a position specifying process achieved by a program executed by the computer system 140. FIG. 4 shows the flowchart of the position specifying process. The position specifying process is initiated in response to the user's touching of any position in the first window W1. When the process is initiated, the computer system 140 keeps acquiring the contact position to recognize sliding operation or releasing operation.

When the process is initiated, the computer system 140 acquires the position where the user first touches the first window W1 as an initial contact position (step S100) and displays a position specifying cursor in the initial contact position (step S110).

The computer system 140 subsequently determines whether or not the distance from the initial contact position to the contact position reaches a predetermined distance (step S120). In a case where the distance from the initial contact position to the contact position has not reached the predetermined distance (No in step S120), the computer system 140 evaluates whether or not the contact position can be sensed (that is, whether or not contact has been terminated) (step S180). The predetermined distance may be a distance that allows the user to clearly visually recognize the initial contact position by moving the finger, the pen, or any other object that is in contact with the initial contact position by the predetermined distance. For example, the predetermined distance may be set at about 2 cm. In a case where the contact position cannot be sensed (Yes in step S180), the computer system 140 hides the position specifying cursor (step S190) and terminates the process with no specified position acquired. On the other hand, in a case where the contact position can be sensed in step S180 (No in step S180), the computer system 140 returns the process to step S120. The computer system 140 therefore repeatedly carries out steps S120 and S180 as long as the contact position can be sensed until the distance to the contact position reaches the predetermined distance.

On the other hand, in a case where the distance from the initial contact position to the contact position has reached the predetermined distance in step S120 (Yes in step S120), the computer system 140 changes the aspect in which the position specifying cursor is displayed (step S130). Changing the aspect in which the position specifying cursor is displayed allows the user to be notified that the travel from the initial contact position to the contact position has reached the predetermined distance. As will be described later, after the distance from the initial contact position to the contact position reaches a predetermined distance, the computer system 140 can acquire a specified position when it senses predetermined position-specifying-operation finalizing operation. The aspect in which the position specifying cursor is displayed in the case where the travel from the initial contact position to the contact position has not reached the predetermined distance is called a "non-effective state," and the aspect in which the position specifying cursor is displayed after the travel from the initial contact position to the contact position reaches the predetermined distance is called an "effective state."

The computer system 140 subsequently moves the position specifying cursor in such a way that the position specifying cursor follows the contact position in accordance with further movement of the contact position being sensed so that the relative position relationship between the position specifying cursor and the contact position at the point of time when the distance from the initial contact position to the contact position has reached the predetermined distance is maintained (step S140).

The computer system 140 subsequently evaluates whether or not the position-specifying-operation finalizing operation has been sensed (step S150). The "position-specifying-operation finalizing operation" refers to specific operation of causing the computer system 140 to acquire the position where the position specifying cursor is displayed as the specified position. In the present example, the position-specifying-operation finalizing operation is contact terminating operation (that is, operation of releasing finger in contact with screen therefrom). In a case where no position-specifying-operation finalizing operation has been sensed (No in step S150), the computer system 140 returns the process to step S140. The computer system 140 therefore repeatedly carries out steps S140 and S150 until the position-specifying-operation finalizing operation is sensed to keep moving the position specifying cursor in such a way that the position specifying cursor follows the contact position. On the other hand, in a case where the position-specifying-operation finalizing operation has been sensed in step S150 (Yes in step S150), the computer system 140 acquires as the specified position the position where the position specifying cursor is displayed when the position-specifying-operation finalizing operation is sensed (step S160). The computer system 140 then displays a mark representing the specified position in the specified position in the first window W1 (step S170) and terminates the process.

A specific example of the position specifying method according to the present embodiment will subsequently be described with reference to an example of the displayed screen.

Figure 5A:
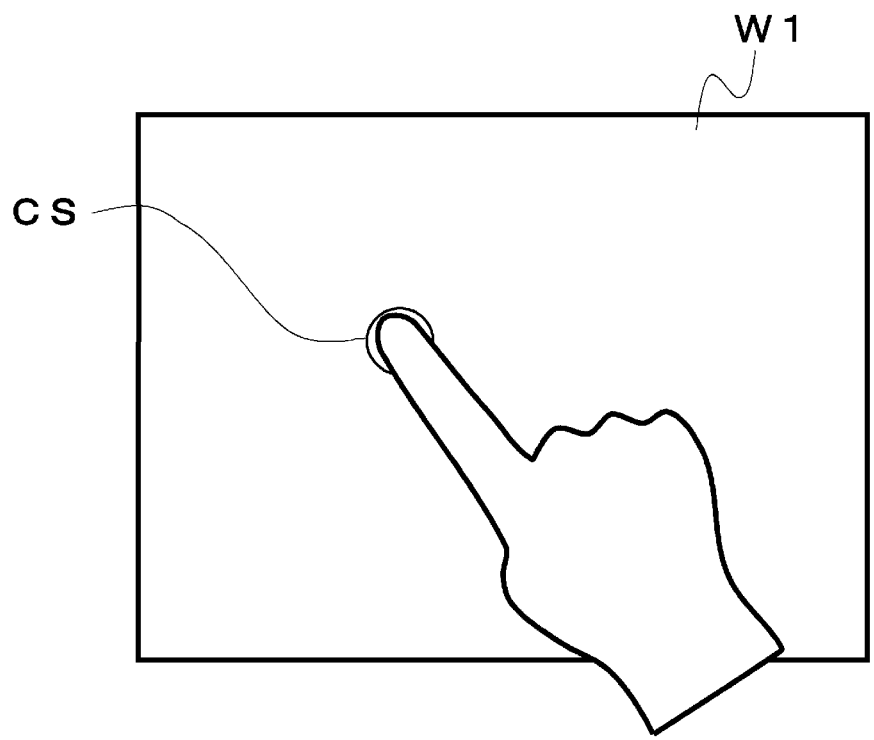
FIGS. 5A and 5B diagrammatically show that a user touches a screen (first window W1) with a finger.
Figure 5B:
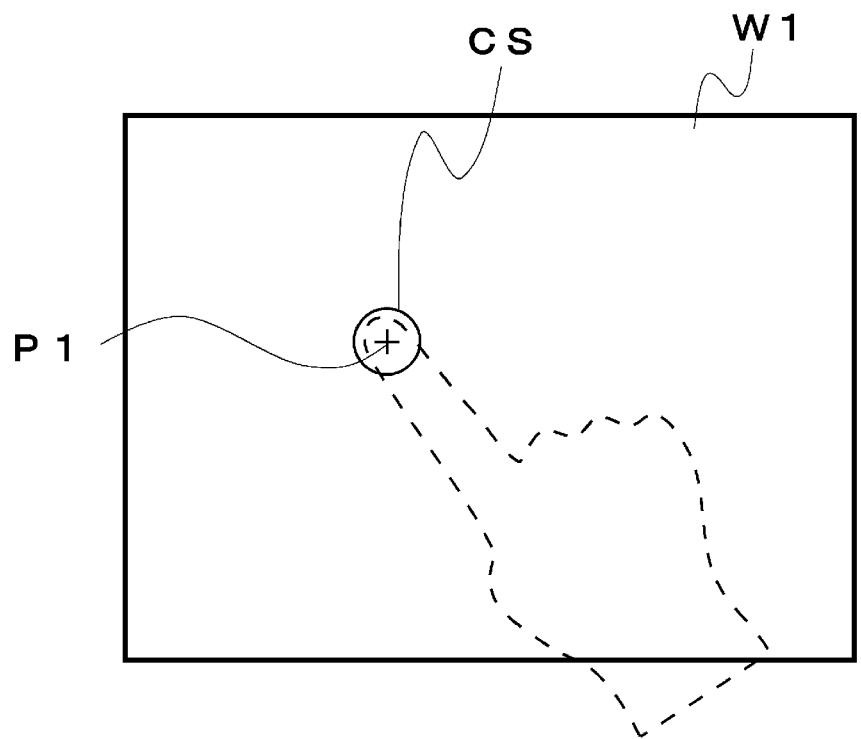

FIGS. 5A and 5B diagrammatically show that the user touches the screen (first window W1) with a finger. FIG. 5A shows the screen of the touch panel display 144 visible to the user when the user touches the screen with a finger and the hand that operates the screen, and FIG. 5B shows an example of the screen displayed when the user touches the screen with the finger and further shows an imaginary line representing the touching finger. The computer system 140 initiates the position specifying process when the user touches the screen with a finger or a pen. The computer system 140 recognizes the center of gravity of the region where the contact has been sensed as an initial contact position P1 and displays a position specifying cursor CS in the initial contact position P1. In the present example, the position specifying cursor CS is formed of cross hairs that intersect in the initial contact position P1 and a circle around the initial contact position P1. The circle may be so sized as to be visually recognizable also in the state in which the finger or the pen is in contact with the screen. For example, the circle may have a diameter of about 3 cm. The thus configured position specifying process CS allows the user to visually recognize part of the position specifying cursor CS even in the state in which the user's finger or any other object hides the contact position, and the contact position sensed by the computer system 140 can be clearly displayed as the position where the cross hairs intersect each other.

Figure 6A:
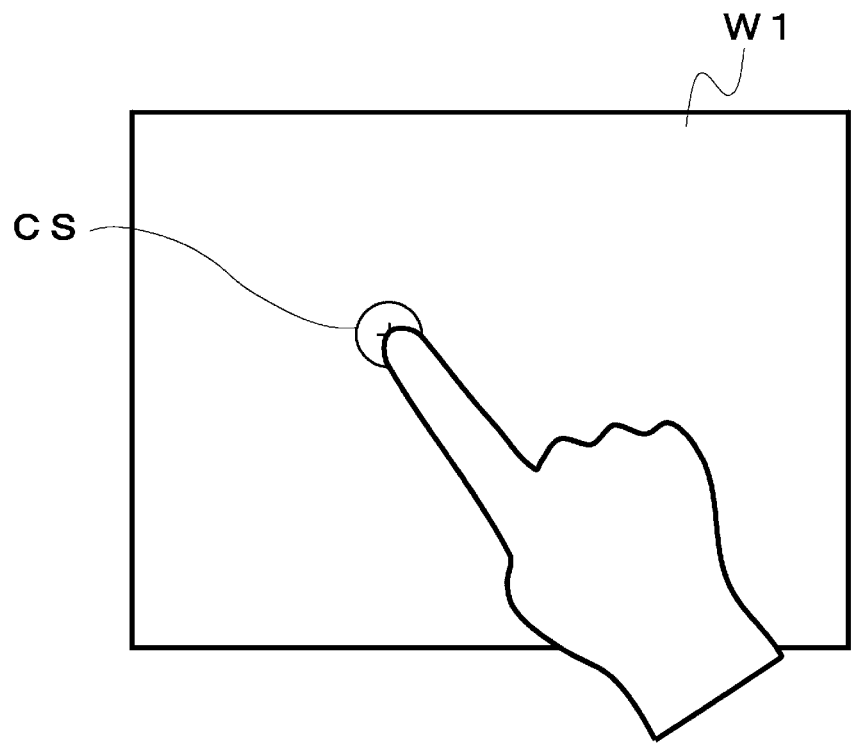
FIGS. 6A and 6B diagrammatically show that a contact position CP is slightly moved from an initial contact position P1.
Figure 6B:
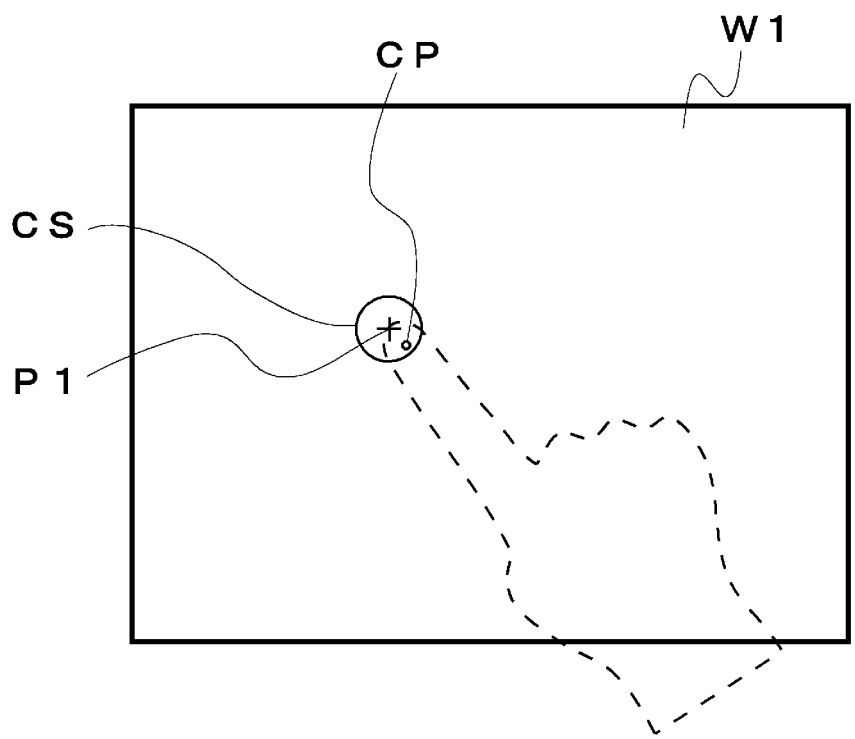

FIGS. 6A and 6B diagrammatically show that a contact position CP is slightly moved from the initial contact position P1. It is noted that the distance from the initial contact position P1 to the contact position CP is smaller than the predetermined distance. FIG. 6A shows the screen of the touch panel display 144 visible to the user and the hand that operates the screen, and FIG. 6B shows an example of the displayed screen along with an imaginary line representing the touching finger. During the period for which the distance from the initial contact position P1 to the current contact position CP is smaller than the predetermined distance, the computer system 140 keeps displaying the position specifying cursor CS in the initial contact position P1, as shown in FIGS. 6A and 6B. When the computer system 140 cannot sense the contact any more (that is, when user releases finger from screen) in the state shown in FIGS. 5A and 5B or 6A and 6B, the computer system 140 hides the position specifying cursor CS and terminates the position specifying process (corresponding to step S190 in FIG. 4).

Figure 7:
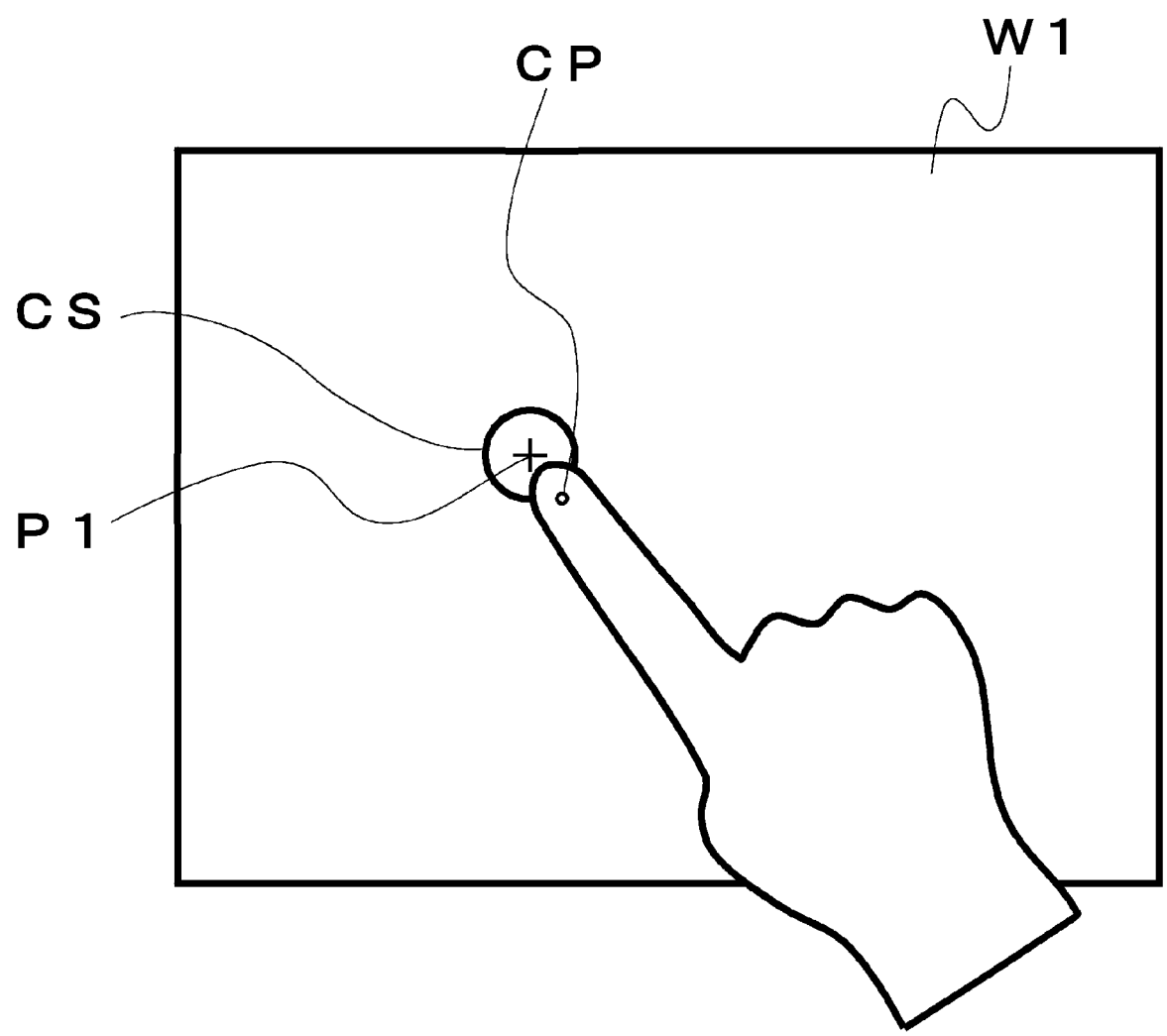
FIG. 7 shows an example of the screen displayed when the distance from the initial contact position P1 to the contact position CP reaches a predetermined distance and further shows the user's finger.

FIG. 7 shows an example of the screen displayed when the distance from the initial contact position P1 to the contact position CP reaches the predetermined distance and further shows the user's finger. The computer system 140, when it senses that the distance from the initial contact position P1 to the contact position CP has reached the predetermined distance, changes the aspect in which the position specifying cursor CS is displayed. The display aspect may be changed in any manner as long as the user can visually recognize the change in the display aspect before and after the change. The change is, however, preferably so made that the visibility of the position specifying cursor CS after the change is higher than the visibility before the change, for example, the circle of the position specifying cursor CS after the change is thicker than the circle before the change.

Figure 8:
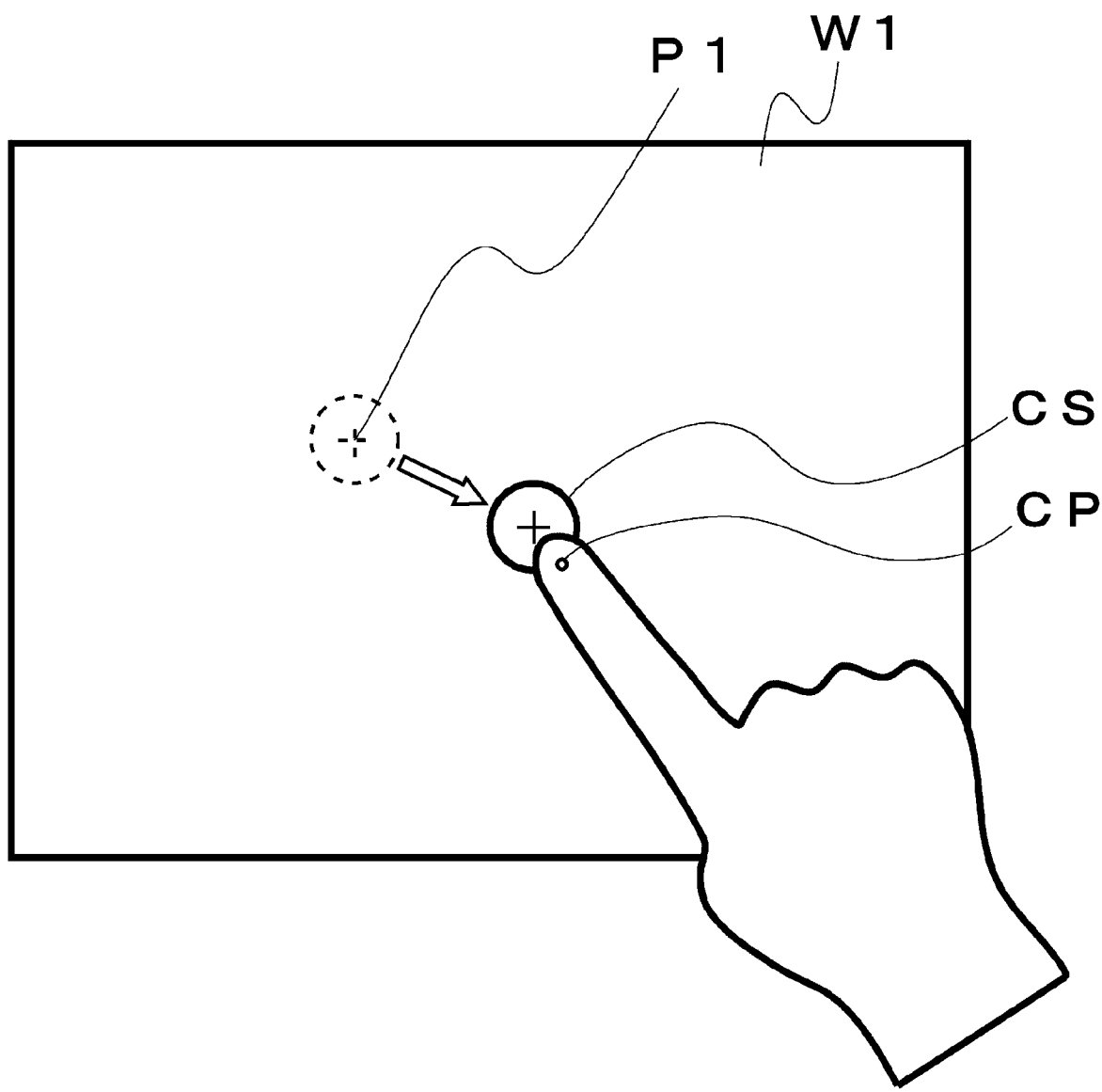
FIG. 8 shows an example of the screen displayed when the contact position CP is further moved from the state shown in FIG. 7 and further shows the user's finger.

FIG. 8 shows an example of the screen displayed when the contact position CP is further moved from the state shown in FIG. 7 and further shows the user's finger. In FIG. 8, the position specifying cursor in the state shown in FIG. 7 is drawn with a broken line in the form of an imaginary cursor. The computer system 140 moves the position specifying cursor CS in such a way that the position specifying cursor CS follows the contact position CP so that the relative position relationship between the position specifying cursor CS and the contact position CP at the point of time when the distance from the initial contact position P1 to the contact position CP has reached the predetermined distance is maintained, as shown in FIG. 8. That is, in the case where when the distance from the initial contact position P1 to the contact position CP reaches the predetermined distance, the contact position CP is located on the lower right of the initial contact position P1 (that is, position specifying cursor CS is displayed on upper left of contact position CP) as shown in FIG. 7, and when the contact position CP is further moved, the position specifying cursor CS is not hidden by the finger or any other object in contact with the contact position CP but is always displayed on the upper left of the contact position CP.

Figure 9:
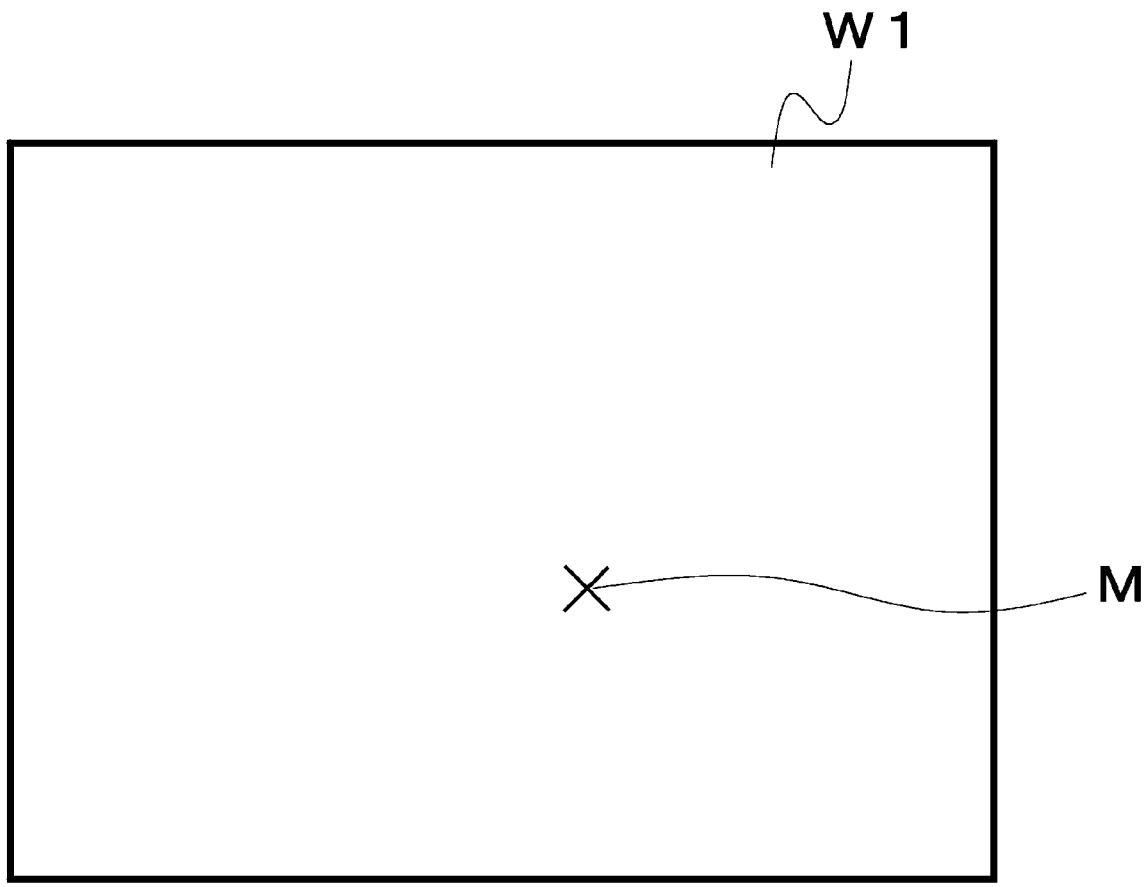
FIG. 9 shows an example of the screen displayed after a position-specifying-operation finalizing operation is sensed.

FIG. 9 shows an example of the screen displayed after the position-specifying-operation finalizing operation (termination of contact in present example) is sensed. When the user moves the contact position CP in such a way that the position specifying cursor CS is displayed in a desired position and performs the position-specifying-operation finalizing operation (that is, user releases finger or any other object from screen), the computer system 140, in response to the position-specifying-operation finalizing operation, acquires as the specified position the position where the position specifying cursor CS was displayed when the position-specifying-operation finalizing operation was performed and hides the position specifying cursor CS. The computer system 140 then displays a mark M (x mark, for example) representing the specified position in the acquired specified position in the screen and terminates the process.

An on-touch-panel-display-position specifying method and a program suitable for operation performed on the touch panel display 144 can thus be achieved. In particular, a position can be accurately specified through touch input performed with a finger or a stylus pen. Further, an unnecessary position specifying process carried out by unintended contact can be avoided.

The first embodiment has been described above, but the present invention is not limited to the example shown in the first embodiment. For example, the position specifying method and the program described above are not limited to image measuring apparatus applications and are also applicable to a variety of applications involving operation of specifying a position in a screen.

In the first embodiment described above, the computer system 140, when it senses contact, displays the position specifying cursor CS in the initial contact position P1. The computer system 140 may instead display the position specifying cursor CS in a position according to the initial contact position P1, that is, a position slightly shifted from the initial contact position P1 in the predetermined direction and by a predetermined distance.

In the first embodiment described above, the description has been made with reference to the case where part of the position specifying cursors is drawn with a thin line in the non-effective state, in which the distance to the position specifying cursor has not reached the predetermined distance, and the part of the position specifying cursors is drawn with a thick line in the effective state after the distance reaches the predetermined distance. The change in the aspect in which the position specifying cursor is displayed before and after the distance reaches the predetermined distance is not limited to the change described above. For example, the display aspect may be so changed, for example, in terms of color that the position specifying cursor is displayed in black in the non-effective state and the position specifying cursor is displayed in red in the effective state.

In the first embodiment described above, the description has been made of the case where the position-specifying-operation finalizing operation is the "termination of contact," but the position-specifying-operation finalizing operation is not limited thereto. For example, the position-specifying-operation finalizing operation may instead be operation of making new contact other than the contact kept by the user since the first contact to move the position specifying cursor to a desired position. That is, after the position specifying cursor is moved to a desired position through contact with a forefinger, another finger (thumb or middle finger, for example) may be used to touch the screen with the desired position touched with the forefinger to finalize the specified position. The computer system 140 may recognize, when it senses a new contact position, that the position-specifying-operation finalizing operation has been performed. As another example, an icon corresponding to a command to finalize the position specifying operation may be displayed, and the user's operation of touching the icon may be the position-specifying-operation finalizing operation.

A person skilled in the art may add or delete a component to or from the embodiment described above, may change the design of a component in the configuration described above, and may combine the features of the embodiment as appropriate with one another. Such a modified embodiment falls within the scope of the present invention as long as the modified embodiment has the substance of the present invention.

Second Embodiment

A second embodiment relates to an image measuring apparatus, a tool editing method, and a program that edit an edge detection tool through input operation performed on a touch panel display.

An image measuring apparatus is used as a measuring apparatus that measures and evaluates the dimensions and shape of a measurement target object (workpiece) by using an image produced by imaging the measurement target object. The image measuring apparatus acquires information on an edge (such as position coordinates of edge) of a measurement target figure contained in the captured image of the measurement target object and evaluates the shape and dimensions of the measurement target object based on the edge information.

The edge information is acquired in many cases by using an edge detection tool placed through the user's operation in a captured image. The edge detection tool identifies the position where and the range over which an edge is scanned in accordance with the shape of a portion of a measurement target, and edge detection tools having a variety of shapes according to the shape of a measurement target object are provided as a function of the image measuring apparatus. Representative examples of the edge detection tool may include a rectangular edge detection tool suitable for detection of an edge of a straight line portion in an image and an annular edge detection tool suitable for detection of an edge in a circular portion in an image.

In recent years, the spread of a touch panel display has caused what is called a touch interface to be widely used as an intuitively easy-to-use user interface that can be operated by touching the display, and such a touch interface is also used in an image measuring apparatus. A touch interface employs gesture-based input. For example, a command is inputted by touching a button with a finger or a touch pen instead of mouse clicking a button.

In an image measuring apparatus employing a touch panel display, an example of a method for readily enlarging, reducing, rotating, or otherwise editing an edge detection tool displayed on the touch panel display may include a method for further displaying editing handles, for example, at the four corners of the edge detection tool and editing the edge detection tool through manipulation of the editing handles with a finger or any other object on the touch panel display. As another method using the editing handles, there is a disclosed technology for improving the operability for a desired editing handle by drawing the editing handle along a drawing line not to cause a situation in which the plurality of editing handles crowd or overlap with a captured image so that the editing operation is hindered (see Japanese Patent Laid-Open No. 2016-173703, for example).

An example of a method using no editing handle includes a method that allows an edge detection tool displayed on a touch panel display to be reduced, enlarged, or otherwise changed by directly performing operation of inputting a gesture, such as pinching in/pinching out actions, on the edge detection tool.

A method using editing handles does not have a simple procedure but has a difficulty in intuitive operation. In a method for directly inputting a gesture to an edge detection tool, it is not sometimes easy to perform direct input to an intended edge detection tool, for example, in a case where the edge detection tool is much larger or smaller than a size that allows easy input with a human finger or a case where a plurality of edge detection tools crowd.

In view of the problems described above, an object of the invention according to the second embodiment is to provide an image measuring apparatus, a tool editing method, and a program that allow intuitive, simple, easy operation of editing an edge detection tool.

The image measuring apparatus according to the second embodiment is an image measuring apparatus that images a measurement target object and uses an edge detection tool placed by the user in the captured image of the measurement target object displayed on a touch panel display to measure the dimensions and shape of the measurement target object, and the image measuring apparatus includes control means for causing the edge detection tool displayed on the touch panel display to be selected and editing the edge detection tool in the selected state in correspondence with a tool editing gesture that is a gesture for editing the edge detection tool when the touch panel display is touched in an arbitrary position thereon so that the tool editing gesture is inputted thereto.

A tool editing method according to the second embodiment is a tool editing method for editing an edge detection tool when a measurement target object is imaged and an edge detection tool placed by the user in the captured image of the measurement target object displayed on the touch panel display is used to measure the dimensions and shape of the measurement target object, and the tool editing method carries out a selection step of causing the edge detection tool displayed on the touch panel display to be selected and an editing step of editing the edge detection tool in the selected state in correspondence with a tool editing gesture that is a gesture for editing the edge detection tool when the touch panel display is touched in an arbitrary position thereon so that the tool editing gesture is inputted thereto.

The tool editing gesture may, for example, be pinching-in and pinching-out actions. The editing corresponding to the pinching-in action may be reduction of the edge detection tool, and the editing corresponding to pinching-out action may be enlargement of the edge detection tool.

The tool editing gesture may instead, for example, be a rotating action, and the editing corresponding to the rotating action may be rotation of the edge detection tool.

The tool editing gesture may still instead, for example, be a swiping action performed in a two-point simultaneous contact state, and the editing corresponding to the swiping action performed in the two-point simultaneous contact state may be parallel translation of the edge detection tool in the swiping direction.

The edge detection tool may be selected when the edge detection tool displayed on the touch panel display is touched and a tool selecting gesture that is the gesture for selecting the edge detection tool is inputted. Further, the tool selecting gesture may be a tapping action.

The function of the control means of the image measuring apparatus according to the second embodiment may be contained in the form of sentences in a program, and a computer may execute the program to achieve the function of the control means.

The second embodiment can provide an image measuring apparatus, a tool editing method, and a program that allow intuitive, simple, easy operation of editing an edge detection tool.

[Editing of Edge Detection Tool by Execution of Control Program]

Figure 10:
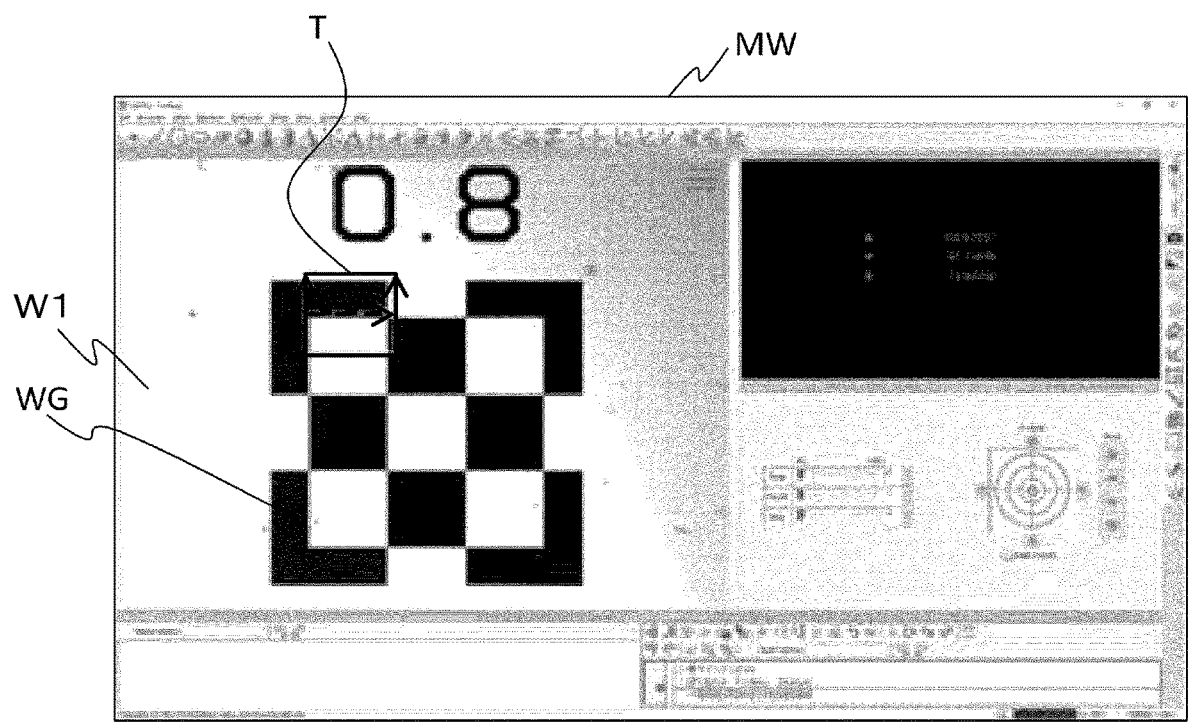
FIG. 10 shows an example of a displayed screen in which an edge detection tool is placed.

The second embodiment is applied to the same image measuring apparatus 1 according to the first embodiment, and simple operation of an edge detection tool is achieved in the displayed screen shown in FIG. 10. FIG. 10 shows a state in which a rectangular edge detection tool T placed in advance by the user's input operation is so displayed as to be superimposed on the captured image WG.

Figure 11:
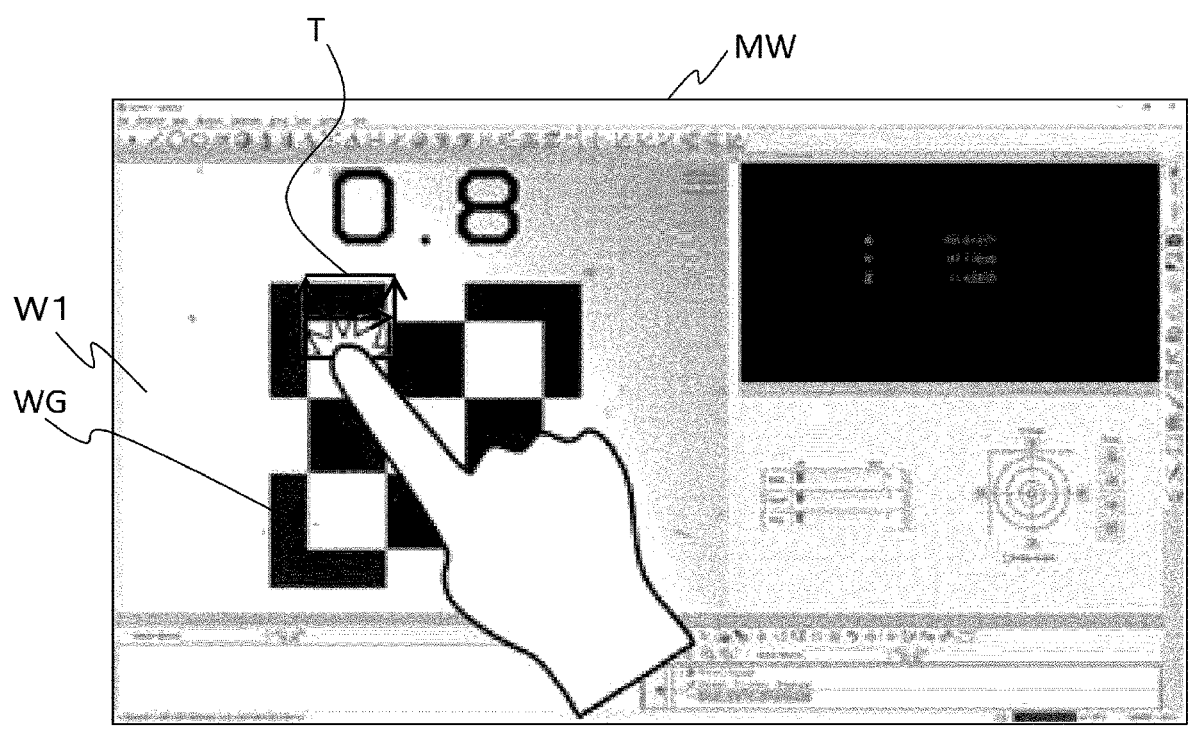
FIG. 11 shows an example of selection of the edge detection tool.

The control program executed by the CPU 211 of the computer main body 141 first causes the edge detection tool T displayed on the touch panel display 144 to be selected when the user touches the touch panel display 144 to input a tool selecting gesture that is a gesture for selecting the edge detection tool T to the touch panel display 144 as shown in FIG. 11 and the control program senses a signal outputted from the touch panel display 144 based on the tool selecting gesture (selection step).

In a case where a plurality of edge detection tools T are placed, the user selects any one of the edge detection tools T and touches the touch panel display 144 to input the tool selecting gesture to the selected edge detection tool T to cause the edge detection tool to be selected. The edge detection tool T is thus identified as a target to be edited.

Figure 12:
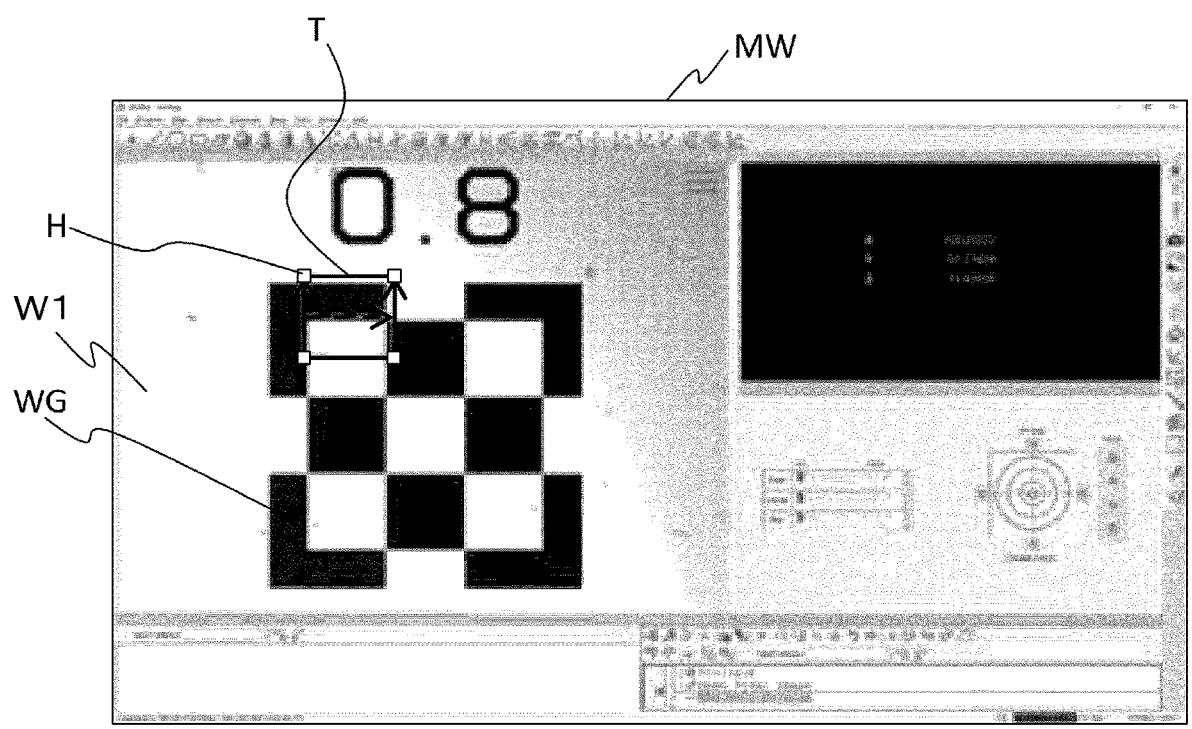
FIG. 12 shows an example in which the edge detection tool has been selected.

The tool selecting gesture may, for example, be an arbitrary gesture, such as tapping, double tapping, or long tapping actions. Further, whether or not the edge detection tool T has been selected is desirably visually recognizable based, for example, on an arbitrary expression, such as by changing the color of the edge detection tool and additionally displaying an editing handle. FIG. 12 shows a case where symbols " " each representing an editing handle H are additionally displayed at the four corners of a rectangular edge detection tool for visual recognition of the selected edge detection tool.

Further, the control program executed by the CPU 211, when the user touches an arbitrary position on the touch panel display 144 to input a tool editing gesture that is a gesture for editing the edge detection tool T in the state in which the edge detection tool T has been selected and the control program detects a signal outputted based on the tool editing gesture from the touch panel display 144, edits the edge detection tool T in correspondence with the tool editing gesture and reflects the result of the editing in the displayed edge detection tool T on the touch panel display 144 (editing step).

Figure 13:
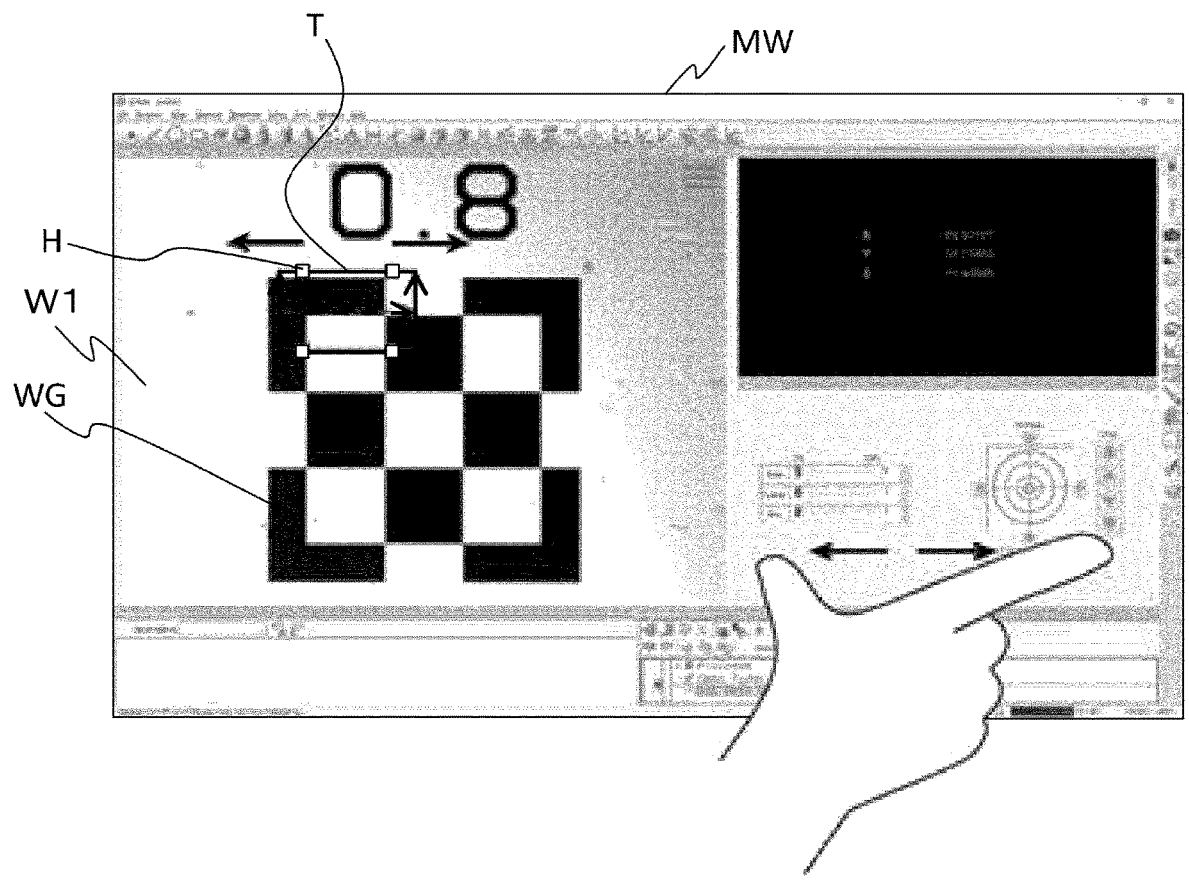
FIG. 13 shows an example of editing of the edge detection tool through gesture input.

The tool editing gesture may be an arbitrary gesture different from the tool selecting gesture, such as a pinching-in action (operation of decreasing distance between two-point contact positions), a pinching-out action (operation of increasing distance between two-point contact positions), a rotating action (operation of changing angle of straight line that connects two-point contact positions), and a swiping action performed in a two-point simultaneous contact state (operation of moving contact positions). It is, however, desirable to employ a gesture that matches an aspect in which the edge detection tool T is edited to allow intuitive input. For example, the editing corresponding to the pinching-in action and the editing corresponding to the pinching-out action are reduction and enlargement, respectively, and the editing corresponding to the rotating action is rotation. Further, the editing corresponding to the swiping action performed in a two-point simultaneous contact state is parallel translation in the swiping direction. The tool editing gesture may also be configured to allow deletion of the edge detection tool T. The tool editing gesture corresponding to deletion of the edge detection tool T may, for example, be operation of moving the tool to a point outside the frame of the workpiece window W1 by using the swiping action performed in a two-point simultaneous contact state, swiping operation performed at a speed greater than or equal to a predetermined threshold in a two-point simultaneous contact state, or any other operation. FIG. 13 shows a case where the pinching-out action is employed to perform lateral enlargement editing on the edge detection tool T.

The position where a tool editing gesture is inputted may not be an arbitrary position on the touch panel display 144 and may be a position in a particular region in consideration of the position where the captured image WG is displayed, the operability of the gesture input, and other factors.

The correspondence between a tool selecting gesture and the state in which the tool is selected and the correspondence between a tool editing gesture and the aspect in which the tool is edited may be stored, for example, in the secondary storage 216 and referred to when the control program is executed or may be contained in the form of sentences in the control program itself.

In the state in which the edge detection tool T is selected, the editing of the edge detection tool T may be allowed only through input of a tool editing gesture or may be allowed also by using an editing handle.

The image measuring apparatus including the control means, the function of which is achieved by the CPU's execution of the control program containing the tool editing method including the selecting step and the editing step described above in the form of sentences, allows intuitive gesture input according to the aspect in which an edge detection tool is edited and further allows editing of the edge detection tool in a small number of actions. Further, editing operation can be reliably performed on a selected edge detection tool irrespective of the size of the edge detection tools and the degree of crowdedness of edge detection tools.

In the embodiment described above, the edge detection tool T is selected when contact input of a tool selecting gesture is performed on the edge detection tool T, but the method for selecting an edge detection tool is not limited thereto. For example, a button for changing which of a plurality of edge detection tools displayed on the touch panel display is selected may be displayed in the main window MW, and an edge detection tool T may be selected in accordance with operation performed on the button (tapping action through touch input and clicking action through mouse operation, for example).

Third Embodiment

A third embodiment relates to an image measuring apparatus and a program that allow command to be inputted through touch input via a touch panel display.

An image measuring apparatus is used as a measuring apparatus that measures and evaluates the dimensions and shape of a measurement target object (workpiece) by using an image produced by imaging the measurement target object. The image measuring apparatus acquires information on an edge (such as position coordinates of edge) of a measurement target figure contained in the captured image of the measurement target object and evaluates the shape and dimensions of the measurement target object based on the edge information.

In recent years, the spread of a touch panel display has caused what is called a touch interface to be widely used as an intuitively easy-to-use user interface that can be operated, for example, by touching the display, and such a touch interface is also used in an image measuring apparatus (see Japanese Patent Laid-Open No. 2016-173703, for example).

In the input operation performed on a touch interface, command input is achieved by using a variety of gestures different from one another in terms of the finger action on the touch interface, such as tapping, double tapping, long tapping, flicking, swiping, and rotating actions, and the state of the contact between the finger and the touch interface. The gesture is performed with one finger in many cases.

In the case where a touch interface is employed to input a command to an image measuring apparatus, some commands used in the image measuring apparatus involve physical movement and motion of the apparatus, such as stage movement and focusing, performed when a command is executed. In a case where a gesture performed with one finger is used to input such a command, the command could be accidentally inputted by unintended contact with the touch panel display, and an accident, such as contact between a measurement target object and the apparatus, could occur in the worst case.

In view of the problem described above, an object of the invention according to the third embodiment is to provide an image measuring apparatus and a program that are unlikely to cause malfunction due to unintended contact with the touch panel display.

The image measuring apparatus according to the third embodiment is an image measuring apparatus that images a measurement target object and measures the dimensions and shape of the measurement target object based on the captured image of the measurement target object displayed on the touch panel display, and it includes control means for identifying a command corresponding to a gesture inputted through touching operation performed on the touch panel display based on a signal outputted from the touch panel display in accordance with the gesture and executing the command on a portion of the image measuring apparatus that is the portion on which the command is executed, and further characterized in that the gesture is performed in an at-least-two-point simultaneous contact state.

The command is, for example, a command that causes some type of physical movement/motion of the portion of the image measuring apparatus.

The gesture performed in the at-least-two-point simultaneous contact state is, for example, a tapping, double tapping, long tapping, flicking, swiping, or rotating action.

The function of the control means may be contained in the form of sentences in a program, and a computer may execute the program to achieve the function of the control means.

The invention according to the third embodiment can provide an image measuring apparatus and a program that are unlikely to cause malfunction due to unintended contact with the touch panel display.

[Action that Occurs when Gesture is Inputted Through Touching Operation Performed on Touch Panel Display]

Figure 14:
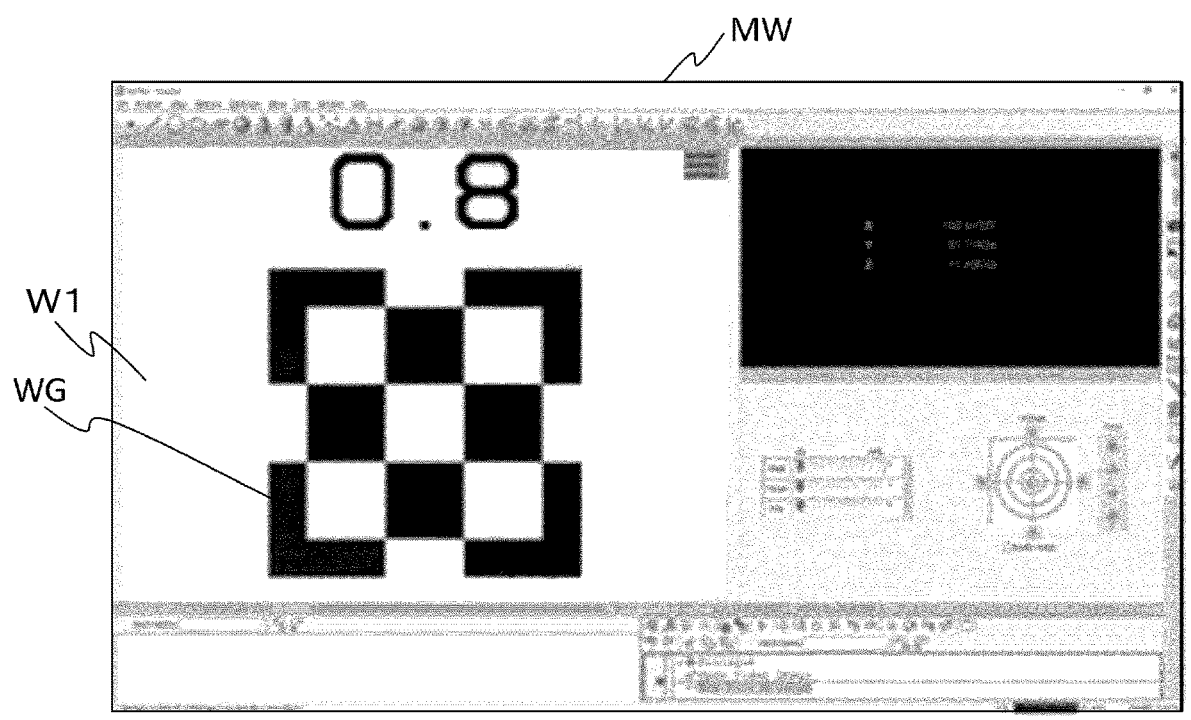
FIG. 14 shows an example of the screen displayed on a touch panel display.

The third embodiment is applied to the same image measuring apparatus 1 according to the first embodiment, and command input suitable for operation using a touch panel display is achieved in the displayed screen shown in FIG. 14. FIG. 14 shows an example of the main window MW displayed on the touch panel display 144 by execution of the image display program. The main window MW displays a plurality of windows as required including the workpiece window W1, in which the captured image WG of the captured workpiece W is displayed. The control program executed by the CPU 211 of the computer main body 141 identifies a command corresponding to a gesture inputted through touching operation performed on the touch panel display 144 based on a signal outputted from the touch panel display 144 in accordance with the gesture and executes the command on a portion of the image measuring apparatus 1 that is the portion on which the command is executed, such as the stage 100 and the enclosure 110.

The inputted gesture is a gesture so performed that the contact is made with the touch panel display 144 in at least two points simultaneously (for example, in the case of finger contact, the touch panel display 144 is touched with at least two fingers simultaneously).

Figure 15:
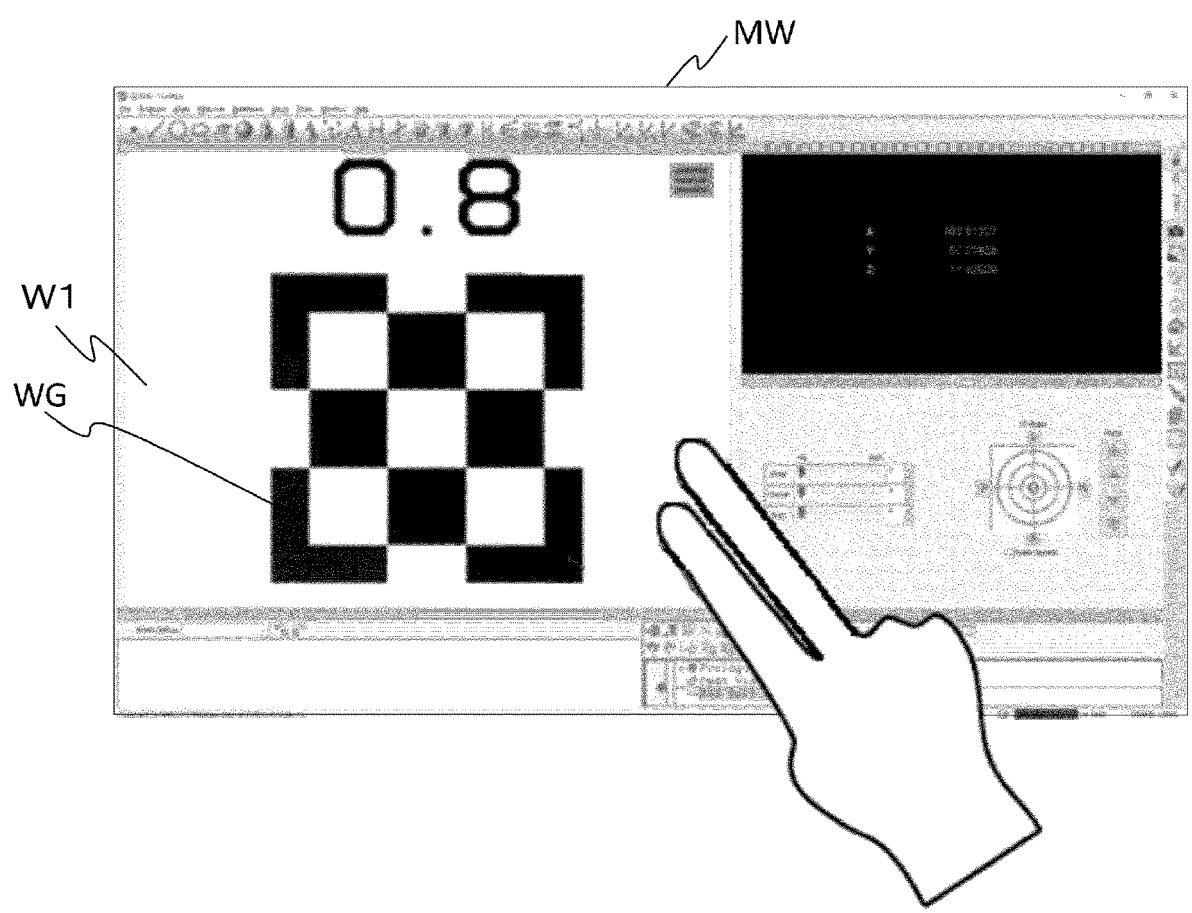
FIG. 15 shows an example of two-finger simultaneous contact with the touch panel display.

Specific examples of the gesture may include tapping, double tapping, long tapping, flicking, swiping, and rotating actions, and the gesture may instead be another gesture performed in an at-least-two-point simultaneous contact state. FIG. 15 shows an example of the simultaneous two-finger contact with the touch panel display 144.

A command corresponding to the gesture can be an arbitrary command. Since the requirement of at-least-two-point simultaneous contact reduces the risk of malfunction due to command input caused by unintended contact with the touch panel, the gesture is preferably applied to a command that requires safety when the command in inputted. For example, examples of such a command include a command that causes physical movement/motion of a portion of the image measuring apparatus 1, such as the stage 100 or the enclosure 110.

Specific examples of assignment of a command to a gesture are as follows:

(1) A motor driving command that causes the stage 100 to move in the X-axis or Y-axis direction is assigned to an X-axis or Y-axis-direction swiping action in the at-least-two-point simultaneous contact state on the captured image WG of the workpiece W displayed on the touch panel display 144.

(2) A motor driving command that causes the stage 100 to move in such a way that the captured image WG is displayed at the center of the workpiece window W1 is assigned to a tapping action in the at-least-two-point simultaneous contact state on the captured image WG of the workpiece W displayed on the touch panel display 144.

(3) A command that causes the optical system in the enclosure 110 to perform autofocusing is assigned to a double tapping action in the at-least-two-point simultaneous contact state on the captured image WG of the workpiece W displayed on the touch panel display 144.

(4) A motor driving command that causes the optical system in the enclosure 110 to move in the Z-axis direction at low speed is assigned to a rotating action in the at-least-two-point simultaneous contact state on the captured image WG of the workpiece W displayed on the touch panel display 144.

The correspondences between a gesture and a command described above may be stored, for example, in the secondary storage 216 and referred to when the control program is executed or may be contained in the form of sentences in the control program itself.

Fourth Embodiment

A fourth embodiment relates to an image measuring apparatus and a program that allow execution of a command through touch operation performed on a command input button displayed on a touch panel display.

An image measuring apparatus is used as a measuring apparatus that measures and evaluates the dimensions and shape of a measurement target object (workpiece) by using an image obtained by imaging the measurement target object. The image measuring apparatus acquires information on an edge (such as position coordinates of edge) of a measurement target figure contained in the captured image of the measurement target object and evaluates the shape and dimensions of the measurement target object based on the edge information.

In recent years, the spread of a touch panel display has caused what is called a touch interface to be widely used as an intuitively easy-to-use user interface that can be operated, for example, by touching the display, and such a touch interface is also used in an image measuring apparatus (see Japanese Patent Laid-Open No. 2016-173703, for example). A touch interface employs gesture-based input. For example, a command is inputted by touching a button with a finger or a touch pen instead of mouse clicking a button.

In image measurement, to appropriately image a portion of a measurement target object that is the portion a user desires to measure with imaging means, the measurement target object is placed on a stage movable in two- or three-dimensional directions, and the stage is moved to adjust the position of the measurement target object relative to the imaging means. A method for inputting a command that causes the stage to move may, for example, be a method for displaying buttons for moving the stage in the two-dimensional directions in such a way that the buttons are superimposed on a captured image of the measurement target object displayed on a display and moving the stage by a predetermined step whenever any of the buttons is clicked once (Japanese Patent Laid-Open No. 10-197224, for example).

There has been provided, however, no method for readily setting a specific mode in a case where a user desires to move the stage in a variety of modes, such as fine adjustment and continuous movement, instead of moving the stage by the predetermined step.

In view of the problem described above, an object of the invention according to the fourth embodiment is to provide an image measuring apparatus and a program that allow setting of a command action mode through touch-input-based easy operation.

The image measuring apparatus according to the fourth embodiment is an image measuring apparatus that images a measurement target object placed on a stage movable in two- or three-dimensional directions and measures the dimensions and shape of the measurement target object based on the captured image of the measurement target object displayed on a touch panel display and further includes control means for displaying a button labeled with an identifier for inputting a predetermined command in such a way that the button is superimposed on the captured image displayed on the touch panel display, further displaying, when a user performs touch input operation on the portion where the identifier is displayed, a menu for selectively inputting an action mode of the command corresponding to the button on the touch panel display, assigning, when the user selects any of action modes in the menu through touch input operation, the selected action mode to the button, and executing, when the user performs touch input operation on the button, the command corresponding to the button in the assigned action mode.

The predetermined command may, for example, be a command that causes the stage to move in any of the two- or three-dimensional directions. The button labeled with the identifier may, for example, be a direction button labeled with an identifier representing any of the two- or three-dimensional directions. The action mode may, for example, include at least two of fine movement, stepwise movement, and continuous movement.

The control means may be configured to display the button when the user performs a predetermined input operation.

The function of the control means may be contained in the form of sentences in a program, and a computer may execute the program to achieve the function of the control means.

The invention according to the fourth embodiment can provide an image measuring apparatus and a program that allow setting of a command action mode through touch-input-based easy operation.

[Screen Display and Action According to Operation]

Figure 16:
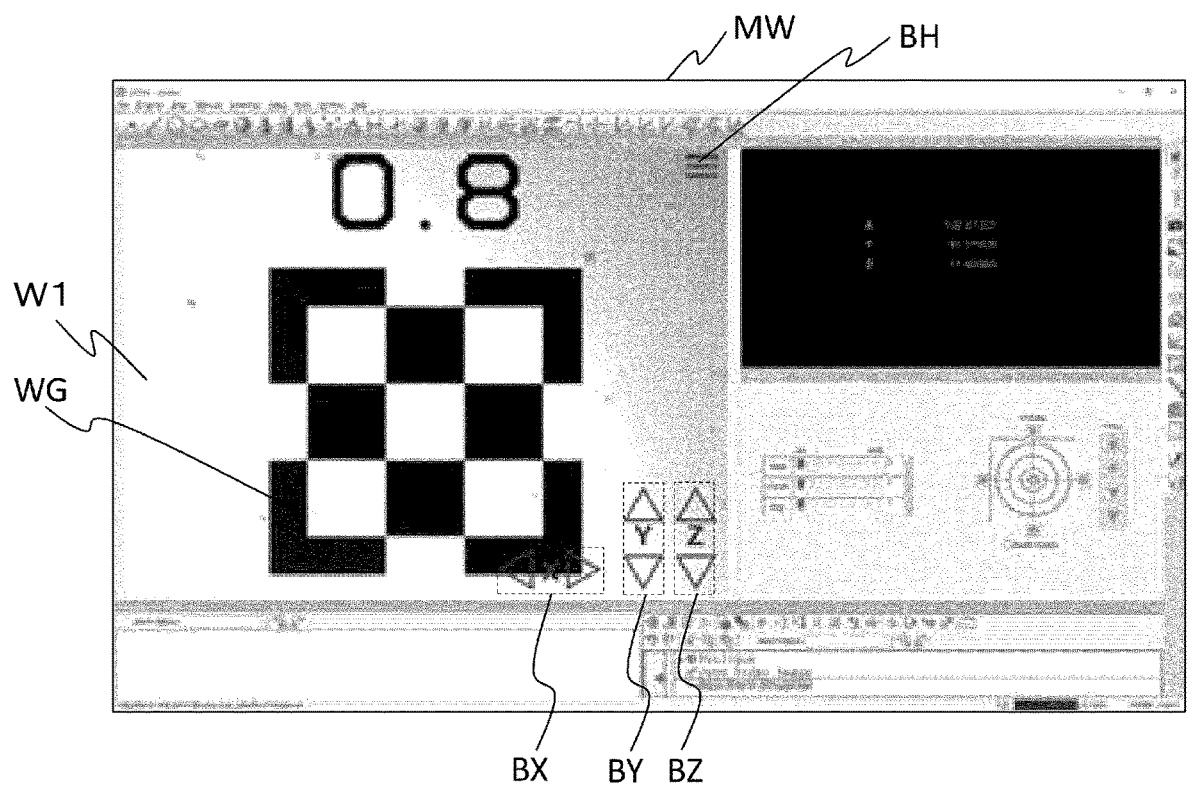
FIG. 16 shows an example of a screen displayed on the touch panel display.

The fourth embodiment is applied to the same image measuring apparatus 1 according to the first embodiment, and command input suitable for operation using a touch panel display is achieved in the displayed screen shown in FIG. 16. FIG. 16 shows an example of the main window MW displayed on the touch panel display 144 by execution of the image display program. The main window MW displays a plurality of windows as required including the workpiece window W1, in which the captured image WG of the captured workpiece W is displayed. A screen displayed on the touch panel display 144 when the CPU 211 of the computer main body 141 executes the control program will next be described. The following description will illustrate a case where a command that causes the stage 100 to move is outputted in response to input operation performed on a button, and the following description is also applicable to a case where a command that causes each component of the enclosure 110 to act is outputted.

The executed control program displays a button BX and a button BY for inputting a motor driving command that causes the stage 100 to move in the directions ±X and ±Y respectively in the workpiece window W1 in such a way that the buttons BX and BY are superimposed on the captured image WG. In the case where the stage 100 is movable also in the direction ±Z with a motor, a button BZ for inputting a motor driving command that causes the stage 100 to move in the directions ±Z is also displayed. To be exact, the buttons BX, BY, and BZ are each divided into two buttons for inputting commands that cause the stage to move in the positive and negative directions, as shown in FIG. 16.

The buttons BX, BY, and BZ are each labeled with an identifier representing the corresponding direction, as shown in FIG. 16. That is, the button BX is labeled with X, the button BY is labeled with Y, and the button BZ is labeled with Z.

Figure 17:
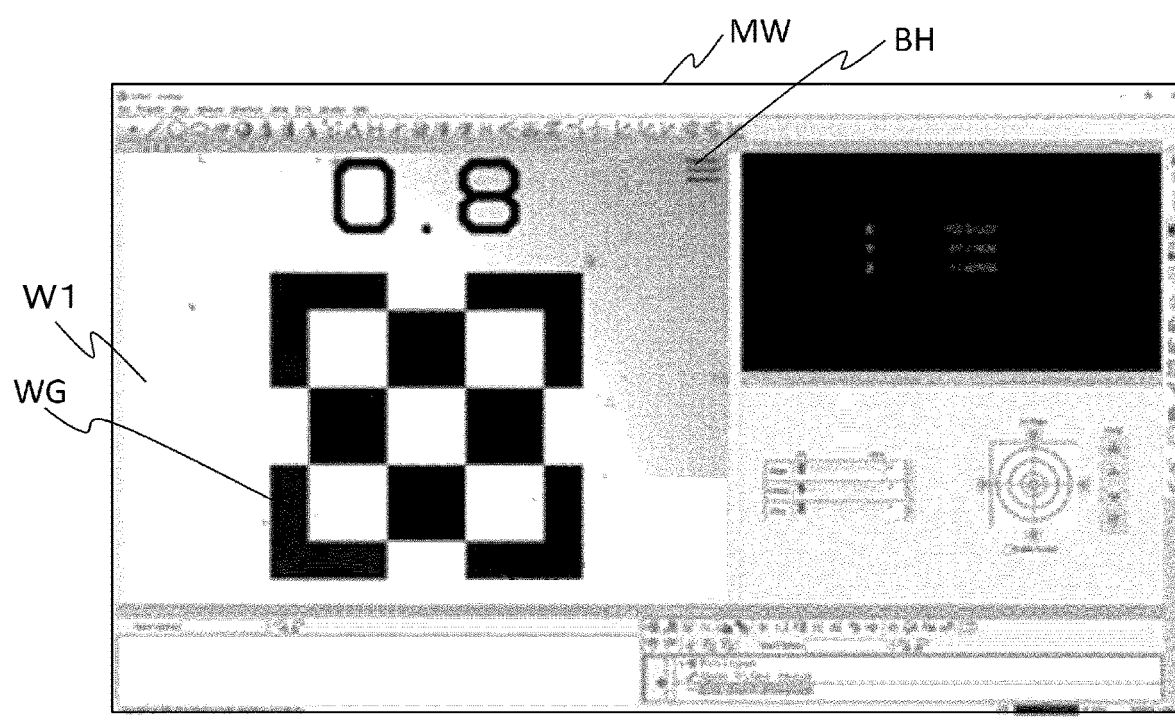
FIG. 17 shows another example of the screen displayed on the touch panel display.

The buttons BX, BY, and BZ may be simultaneously displayed when the captured image WG is displayed or may not be initially displayed and may be displayed in response to some operation inputted by the user. In this case, for example, a hamburger-shaped button BH is displayed at the same time when the captured image WG is displayed, as shown in FIG. 17, and the buttons BX, BY, and BZ are displayed in response to touch input operation performed on the hamburger-shaped button BH, as shown in FIG. 16.

Figure 18A:
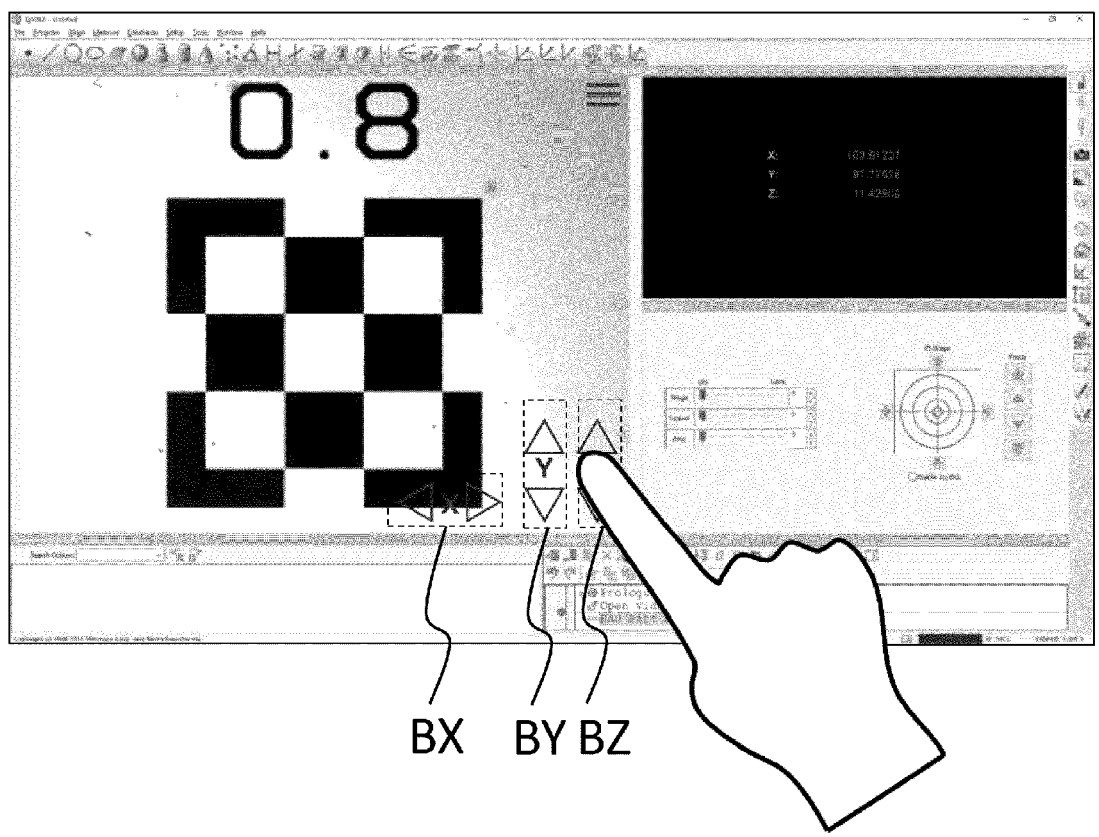
FIGS. 18A and 18B show an example of screen transition in response to touch input operation.
Figure 18B:
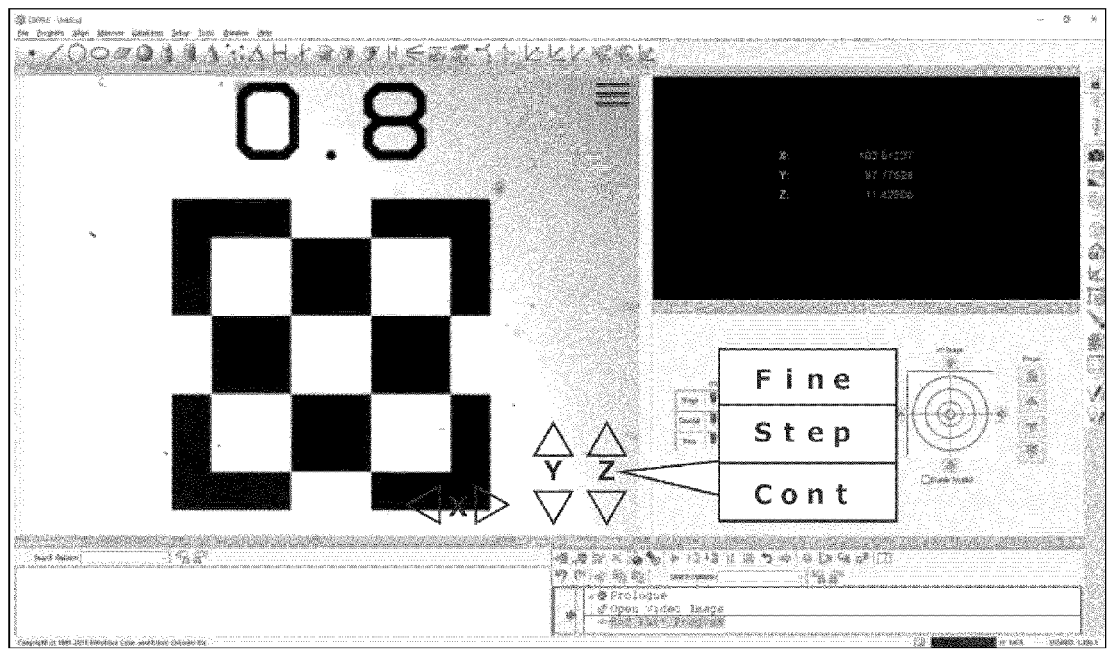

When the user performs touch input operation of touching a portion of the buttons BX, BY, or BZ that is the portion where the identifier is displayed with a finger or a touch pen, the executed control program further displays a menu for selectively inputting an action mode of a command executed when the button labeled with the identifier is touched and input is made once. For example, when the user touches with a finger the portion where Z, which is the identifier with which the button BZ is labeled, is displayed, as shown in FIG. 18A, a menu is displayed for selectively inputting of an action mode in accordance with which the stage 100 is moved in the direction Z when touch input is made once on the button, as shown in FIG. 18B. FIGS. 18A and 18B show a case where Fine (fine movement), Step (stepwise movement), and Cont (continuous movement) can be selected and inputted by way of example.

The types of selectable action mode may be the same in all the directions or may differ from one another on a direction basis.

When the user selects any of the action modes in the menu through touch input operation, the executed control program assigns the selected action mode to the button labeled with the identifier.

Further, when the user performs touch input operation on the button, the executed control program executes a command corresponding to the button on the stage 100 in the action mode assigned to the button.

A method for canceling the action mode assigned to each of the buttons can be an arbitrary method.

The image measuring apparatus according to the fourth embodiment described above can readily assign an action mode of a command through menu selection to a command input button before the command is inputted to the command input button and then allows the user to input the command in the assigned action mode.

Fifth Embodiment

A fifth embodiment relates to an image measuring apparatus, an image measuring method, and an image measuring program suitable for operation using a touch panel display.

An image measuring apparatus is used as a measuring apparatus that measures and evaluates the dimensions and shape of a measurement target object (workpiece) by using an image obtained by imaging the workpiece. The image measuring apparatus acquires information on an edge (such as position coordinates of edge) of a measurement target figure contained in the captured image of the workpiece and evaluates the shape and dimensions of the workpiece based on the edge information. In the image measuring apparatus, what is called a "one-click tool" is provided as a tool for acquiring edge information through simple operation. The one-click tool, when the user specifies a position on a displayed screen, automatically searches an edge location contained in a predetermined range around the specified position to automatically acquire edge information. In this process, in a case where a plurality of edges have been found in the predetermined range under the search, edge information on an edge having the highest intensity is acquired. A method including the steps described above has been provided (see Japanese Patent No. 3,595,014, for example).

In recent years, the spread of a touch panel display has caused what is called a touch interface to be widely used as an intuitively easy-to-use user interface that can be operated, for example, by touching the display.

A touch interface allows intuitive operation but has a difficulty in accurately specifying a user's intended position when the user attempts to specify a position in a fine level in a displayed screen. That is, to specify a position in the displayed screen with conventional input means represented by a mouse, a mouse or any other input means is used to move a cursor displayed in the screen and position the cursor accurately in an intended position to specify the position. In contrast, in the case of a touch interface, the center of gravity of a region where a finger or a tip of a pen is in contact with the display is typically the specified position. Since the center of gravity of the contact region is behind the finger or the tip of the pen and therefore invisible to the user, the user cannot grasp the accurate position specified by the user, and it is therefore not easy to accurately specify the intended position.

It is conceivable that applying such a touch interface to operate an image measuring apparatus and using as input means for inputting operation to the one-click tool frequently cause a case where the predetermined range over which the search is performed by the one-click tool does not contain an intended edge. To allow the search range to be likely to contain the intended edge, a measure is taken to widen the one-click-tool search range as compared with the search range in related art. In this case, a plurality of edges is more likely to be found in the search range. In a case where a higher intensity edge is present in the vicinity of the edge intended by the user, the automatic edge identification based on the edge intensity undesirably prevents the one-click tool from acquiring edge information on the edge intended by the user.

In view of the problem described above, an object of the invention according to the fifth embodiment is to provide an image measuring apparatus, an image measuring method, and an image measuring program suitable for operation using a touch panel display.

To solve the problem described above, the image measuring apparatus according to the fifth embodiment includes an imager that acquires an image of a measurement target object, a touch panel display that displays the image acquired by the imager and accepts touch input operation of specifying a position in the displayed image, and an edge detector that searches for and detects an edge present in a predetermined range around the in-image specified position specified by a user's touch input operation in the image displayed on the touch panel display. The edge detector is characterized in that when a plurality of edges are found in the vicinity of the specified position, a control object for selecting each of the edges is displayed on the touch panel display not only in an aspect that prevents a wrong edge from being selected through the touch operation but in an aspect that allows visual recognition of the correspondence between each of the edges and the corresponding control object.

In the fifth embodiment, the edge detector may set the predetermined range, over which an edge is searched for, in accordance with the size of the region where the touch panel display senses contact resulting from the touch input operation.

Further, in the fifth embodiment, the image measuring apparatus may further include second input means that differs from the touch panel display allowing input operation of specifying a position, and the edge detector, when touch operation performed on the touch panel display specifies the specified position, may search a wider range to detect an edge than in the case where the specified position is specified by input operation performed on the second input means.

To solve the problem described above, an image measuring method according to the fifth embodiment includes the steps of displaying an image of a measurement target object on a touch panel display, accepting touch input operation of specifying a position in the image displayed on the touch panel display, and searching for and detecting an edge present in a predetermined range around the specified position specified in the touch operation accepting step. The image measuring method is characterized in that when a plurality of edges are found in the vicinity of the specified position, a control object for selecting each of the edges is displayed on the touch panel display not only in an aspect that prevents a wrong edge from being selected through the touch operation but in an aspect that allows visual recognition of the correspondence between each of the edges and the corresponding control object.

To solve the problem described above, an image measuring program according to the fifth embodiment is a program for detecting an edge of a figure contained in an image of a measurement target object and is characterized in that the image measuring program causes a computer to perform the image measuring method described above.

[Flowchart of Processes Carried Out by One-Click Tool]

Figure 19:
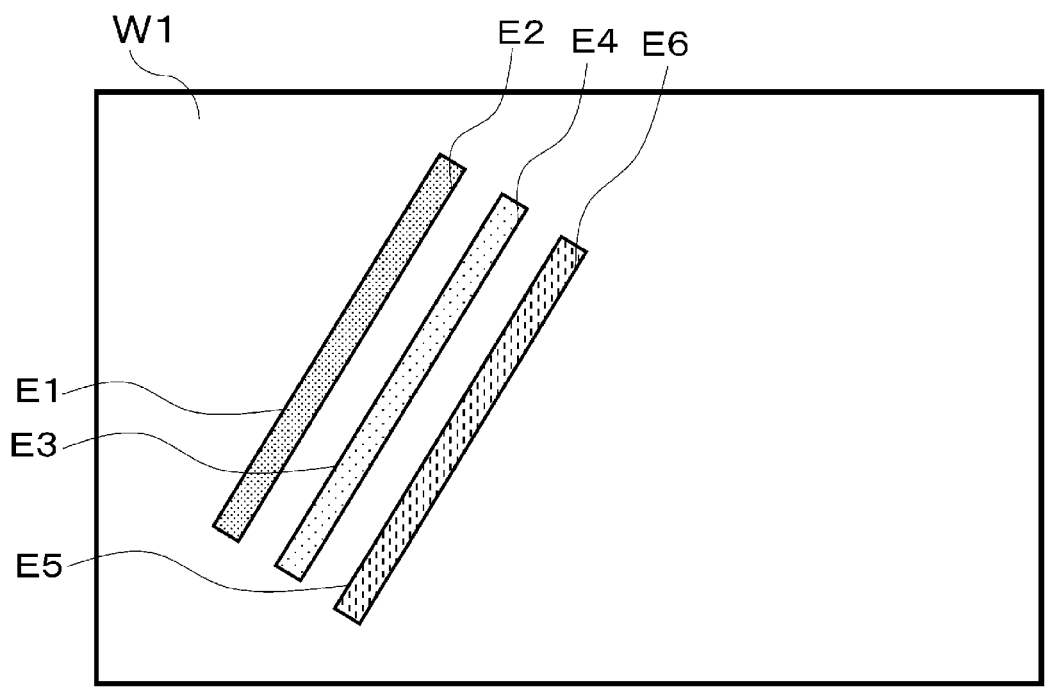
FIG. 19 shows an example of the displayed first window before edge information is acquired.

The fifth embodiment is applied to the same image measuring apparatus 1 according to the first embodiment and achieves edge detection suitable for operation using a touch panel display in the displayed screen shown in FIG. 3. The procedure of a method for acquiring edge information will be described based on a "one-click tool" capable of acquiring, through single position specifying operation, information on an edge (such as position coordinates of edge) of a measurement target figure contained in the image WG of the workpiece W displayed in the first window W1. The method is achieved by a program executed by the computer system 140. FIG. 19 shows an example of the displayed first window W1 before edge information is acquired. In the example shown in FIG. 19, three inclining oblong figures are displayed in the first window W1. The six long sides of the oblongs are called edges E1 to E6, respectively. In the following description, a procedure of acquiring edge information on the straight line E2 out of the edges E1 to E6 by using the one-click tool will be described.

Figure 20:
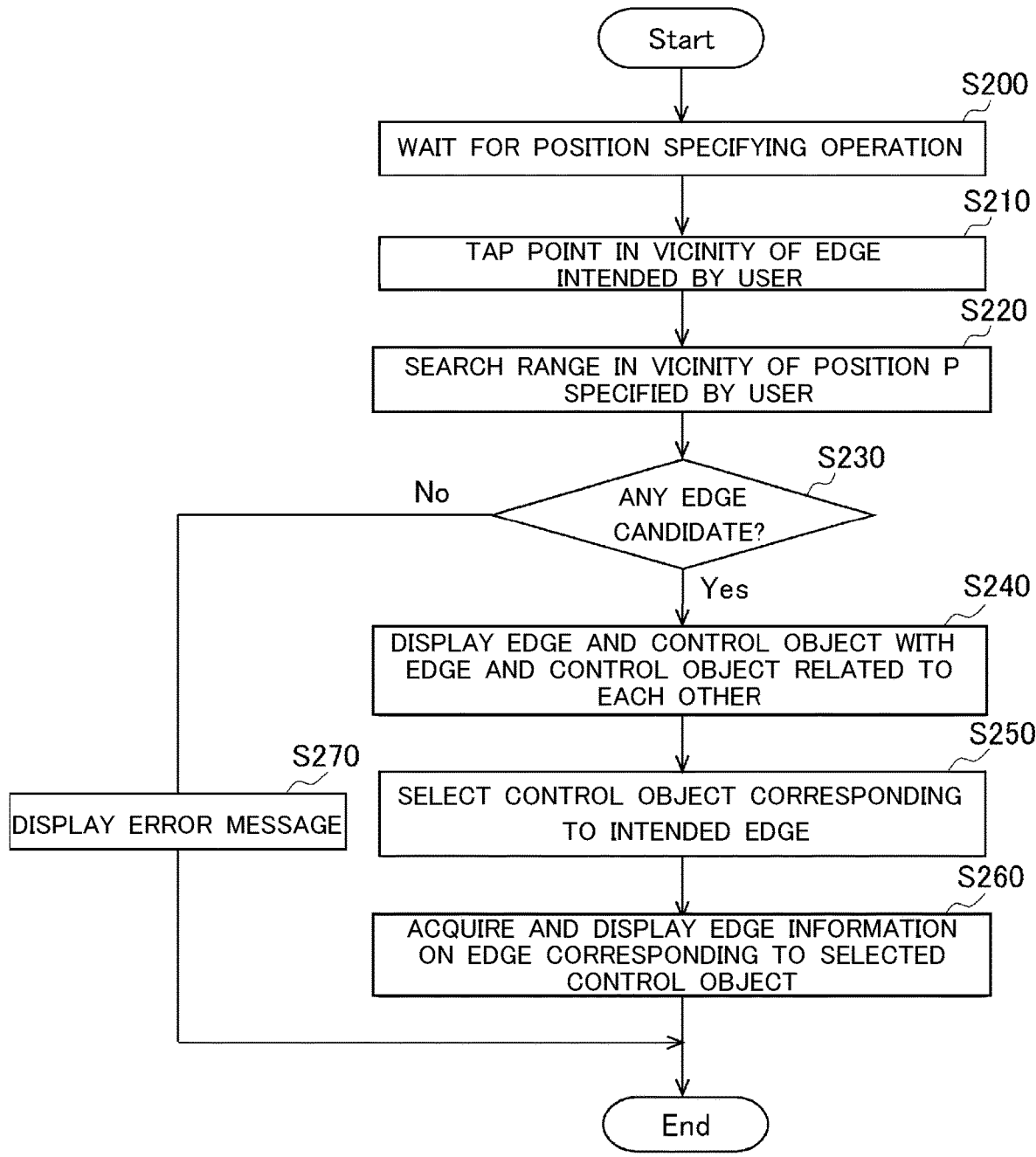
FIG. 20 is a flowchart of the process of acquiring edge information by using a one-click tool.

FIG. 20 is a flowchart of the process of acquiring the edge information by using the one-click tool.

The process of acquiring the edge information by using the one-click tool is initiated when the user taps the icon of a straight line measuring method (length of straight line, for example) as a function in the third window W3 in FIG. 3 to specify the measuring method and further taps the icon of the one-click tool in the second window W2 in FIG. 3 to select the one-click tool as the method for specifying a measurement point.

Figure 21:
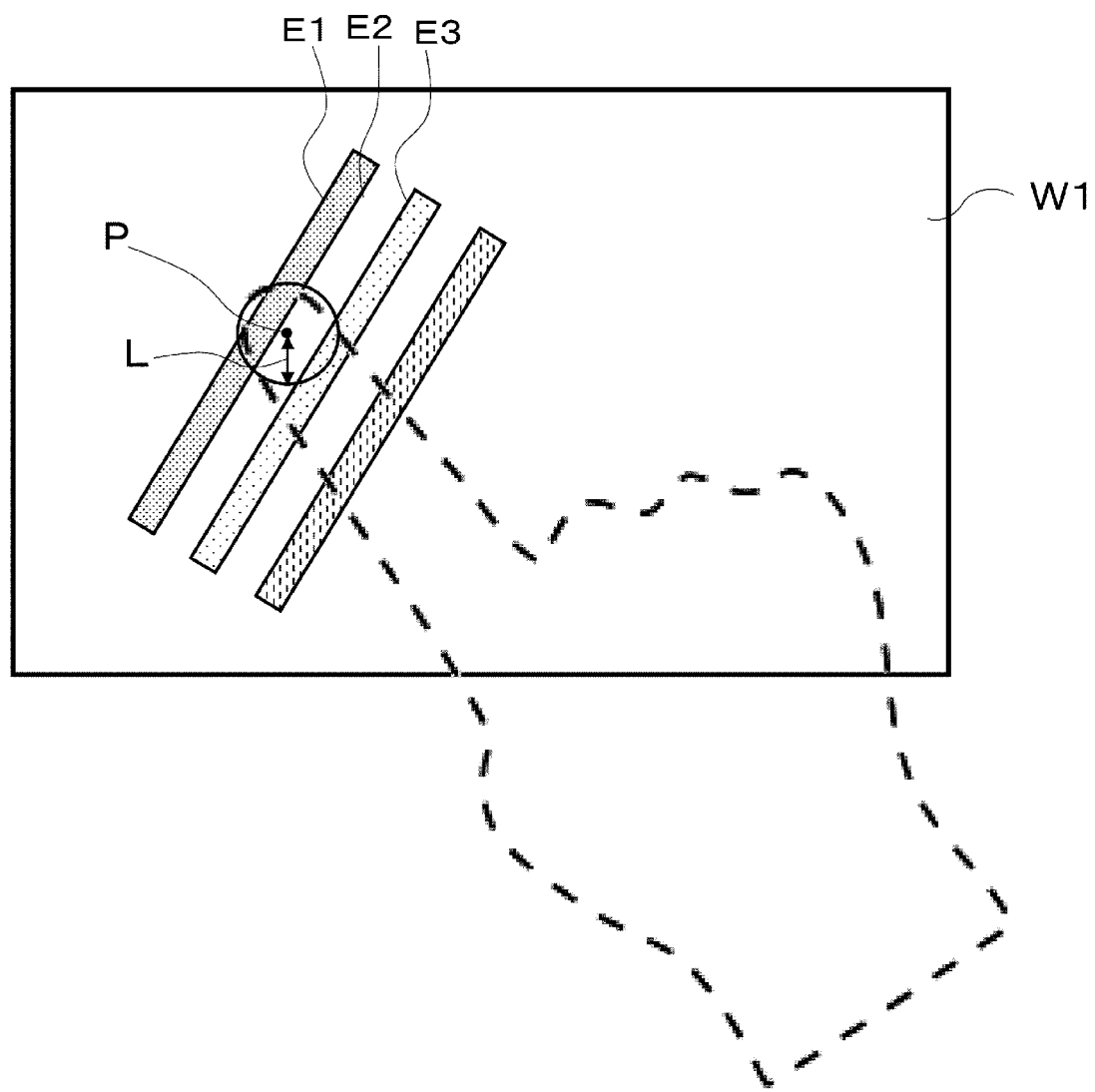
FIG. 21 diagrammatically shows position specifying operation performed on an image of a workpiece displayed in the first window.

When the process is initiated, the computer system 140 waits for the user's operation of specifying a position in the first window W1 (step S200). To specify an edge from which the user desires to acquire edge information, the user subsequently taps a point in the vicinity of the desired edge, as shown in FIG. 21. In the present example, the user taps a point in the vicinity of the edge E2 (step S210). At this point, the touch panel display 144 recognizes a position P shifted from the edge E2 as the specified position in some cases although the user intended to tap a point on the edge E2, and it is assumed in the present example that the specified position P is shifted from the edge E2. The computer system 140 subsequently searches a predetermined range around the position P specified by the tapping (step S220) to find candidates of the edge (step S230). The predetermined range L over which the search is performed may be a region having a size roughly equal to the size of a contacting finger (diameter of about 1 cm, for example).

A method for searching the predetermined range L to acquire edge candidates in steps S220 to S230 can be achieved, for example, as follows: First, a two-dimensional differential filter is applied to a position around the position P radially within the predetermined range L on a predetermined angle basis to determine a value representing the degree of change in density (brightness) of a pixel in the position where the distance from the position P falls within the predetermined range L, and a position where the value is greater than a predetermined value is recognized as an edge candidate position. What is called a box tool can then be applied to each of the recognized edge candidate positions to acquire a straight-line edge formed of many points around the edge candidate position to acquire a plurality of straight-line edge candidates around the position P specified by the user.

In a case where an edge candidate is found in the predetermined range L (Yes in step S230), the computer system 140 relates a control object (such as button for accepting operation performed on touch panel display 144 or performed with mouse 143) to the found edge candidate and displays the control object on the touch panel display 144. In a case where a plurality of edge candidates are found, a plurality of control objects are displayed. In this case, the computer system 140 displays the plurality of control objects not only in an aspect that prevents a wrong control object from being selected through touch operation performed on the touch panel display 144 but in an aspect that allows visual recognition of the correspondence between the edges and the control objects (step S240). In the present example, not only the edge E2, which the user desires to acquire, but the edges E1 and E3 are found in the predetermined range L around the position P, as shown in FIG. 21. The computer system 140 then displays buttons B1 to B3 in correspondence with the edges E1 to E3. At this point, the buttons B1 to B3 are so displayed as to be separate from one another by about 1 cm so that a wrong button is not selected through touch operation. The computer system 140 further displays a straight line that connects one point on each of the edges E1 to E3 to the corresponding one of the buttons B1 to B3 on the touch panel display 144 so that the correspondence between the edges and the control objects is visually recognizable.

Figure 22:
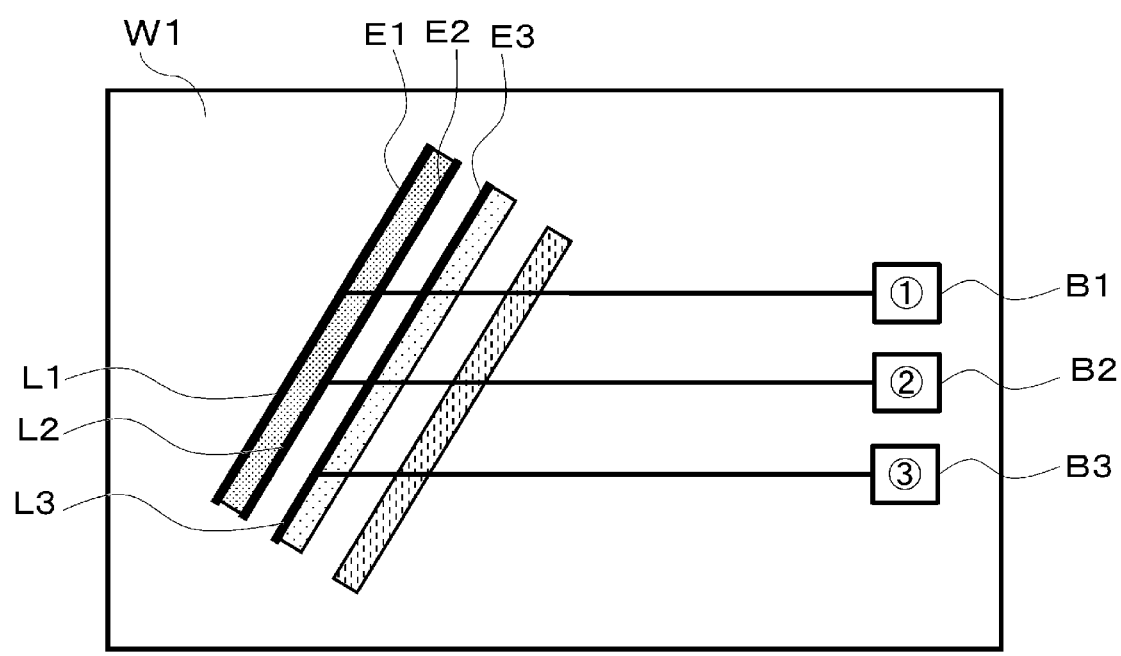
FIG. 22 shows an example of the first window displayed when a plurality of edges have been detected.

The computer system 140 further displays imaginary lines L1 to L3, which are superimposed on the edge candidates, on the touch panel display 144, as shown in FIG. 22. Displaying the imaginary lines in such a way that they are superimposed on the edge candidates allows the user to readily visually recognize the edges that are found edge candidates.

Figure 23:
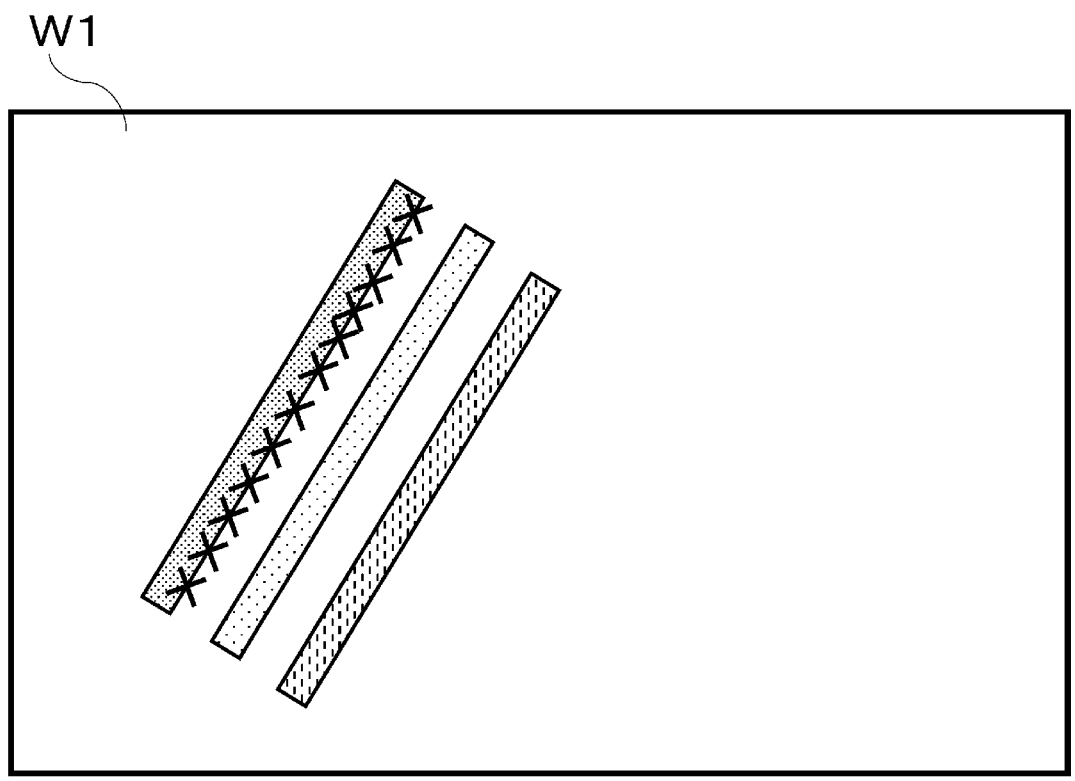
FIG. 23 shows an example of the first window displayed after one edge is selected.

The user subsequently taps the control object corresponding to the edge from which the user desires to acquire edge information. In the state in which the buttons B1 to B3 are displayed in relation to the edges E1 to E3 as shown in FIG. 22, when the user taps the button B2 corresponding to the edge E2 (step S250), the computer system 140 acquires edge information (such as position coordinates) on the edge corresponding to the selected control object, displays the edge information in such a way that the edge information is superimposed on the image WG of the workpiece W (step S260), and terminates the process. In the present example, edge information on the edge E2 corresponding to the button B2 tapped by the user is acquired, and the acquired edge information (coordinates of edge) is so displayed as to be superimposed on the image WG of the workpiece W, as shown in FIG. 23.

On the other hand, in a case where no edge candidate is found in the predetermined range L (No in step S230), an error message stating that no edge has been detected is displayed (step S270), and the process is terminated.

The process flowchart described above allows edge information acquisition using the one-click tool suitable for operation performed on the touch panel display 144. In particular, a desired edge can be readily selected by using the one-click tool on the touch panel display 144 even at a location where edges crowd.

The present embodiment has been described above, but the present invention is not limited thereto. For example, the above embodiment has been described with reference to the case where a line connects a control object and an imaginary line of an edge to each other to display the correspondence therebetween in a visually recognizable manner, but a method for displaying the correspondence between an edge and a control object in a visually recognizable manner is not limited to the line connection. For example, each set of an imaginary line and the corresponding control object may be displayed in a color different from the colors of the other sets so that the correspondence between the imaginary line and the corresponding control object is recognized, or each of the sets of a control object and the imaginary line of the corresponding edge may be sequentially caused, for example, to blink in synchronization with each other for visual recognition of the correspondence between the imaginary line of the edge and the control object.

The above embodiment has been further described with reference to the case where a plurality of control objects are so displayed as to be separate from one another so that the control objects are displayed in an aspect that prevents a wrong control object from being selected through touch operation, but the aspect that prevents a wrong one of the plurality of control objects from being selected through touch operation is not limited to the aspect described above. For example, the button displayed as each of the control objects is so sized as to be large enough not to cause wrong selection through touch operation (quadrangular shape having each side greater than or equal to about 1 cm, for example), whereby selection of a wrong control object through touch operation can be avoided even in a case where the buttons are arranged at narrow intervals (or buttons are arranged with no gap).

The above embodiment has been described with reference to the case where a straight-line edge is detected by using the one-click tool. An edge to be extracted may instead have a shape other than that of a straight line (circular or elliptical shape, for example) A method for extracting edges of a variety of shapes can be achieved by applying an existing approach as appropriate.

The above embodiment has been described with reference to the case where an error message is displayed and the process is terminated when no edge is found in the predetermined range L over which the search is performed. Instead, when no edge is found in the search range, the search range may be increased, and the process may be continued until an edge candidate is found.

In the embodiment described above, the predetermined range L over which the search is performed is a fixed range. The predetermined range L may instead be a variable range. For example, the predetermined range L may be changed in accordance with the size (such as area, perimeter, and maximum diameter) of a region where the user has touched the touch panel display 144. Since the amount of shift of position specifying operation is believed to fall within the range where the contact is made, the configuration described above prevents an excessively wide search range but allows an appropriate edge candidate to be presented with the processing speed increased.

In the embodiment described above, edge search position in the first window W1 is specified through touch operation performed on the touch panel display 144. The edge search position may, of course, instead be specified by using input means other than a touch panel display, such as a mouse operation. In this case, the search range may be changed through mouse operation and tapping operation with a finger or pen. Input means other than a touch panel display, such as a mouse, allows the user to accurately specify an intended position as compared with the tapping operation. In the case where a position is specified by input means other than a touch panel display, the predetermined range L over which the search is performed may therefore be narrowed as compared with the case using the tapping operation. An appropriate search range can thus be achieved in accordance with the position specifying method, whereby an appropriate edge candidate can be presented with the processing speed increased.

In the embodiment described above, an edge candidate and a control object are so displayed that the correspondence therebetween is visually recognizable irrespective of the number of found edge candidates. Instead, when only one edge candidate is found, it is assumed that the user has specified the found edge candidate, and edge information may be acquired with no control object displayed (that is, step S240 skipped).

What is claimed is:

1. A position specifying method for specifying a position through touch input in a screen displayed on a touch panel display, the method comprising the steps of:

acquiring an initial contact position that is a contact position at a start of sensing of a position where contact is made with the touch panel display;

displaying a position displaying cursor in a position according to the initial contact position;

displaying the position displaying cursor in the position according to the initial contact position during a period for which the contact position sensing continues until a distance from the initial contact position to the contact position reaches a predetermined distance and terminating the display of the position displaying cursor with no position specifying operation performed in a case where the contact position sensing is terminated before the distance from the initial contact position to the contact position reaches the predetermined distance; and displaying the position displaying cursor in such a way that the position displaying cursor follows movement of the contact position after the distance from the initial contact position to the contact position reaches the predetermined distance so that a relative positional relationship between the position displaying cursor and the contact position at a point of time when the distance from the initial contact position to the contact position reaches the predetermined distance is maintained during the period for which the contact position sensing continues and setting, when position-specifying-operation finalizing operation is sensed after the distance from the initial contact position to the contact position reaches the predetermined distance, a position where the position displaying cursor is displayed when the position-specifying-operation finalizing operation is sensed to be a specified position.

2. The position specifying method according to claim 1, wherein the position according to the initial contact position is the initial contact position.

3. The position specifying method according to claim 1, wherein an aspect in which the position displaying cursor is displayed before the distance from the initial contact position to the contact position reaches the predetermined distance differs from an aspect in which the position displaying cursor is displayed after the distance from the initial contact position to the contact position reaches the predetermined distance.

4. The position specifying method according to claim 1, wherein the position-specifying-operation finalizing operation is operation of terminating the contact.

5. A program that causes a computer to carry out the position specifying method according to claim 1.

\* \* \* \* \*